US012159249B2

United States Patent
Cheek, Jr. et al.

(10) Patent No.: US 12,159,249 B2
(45) Date of Patent: Dec. 3, 2024

(54) METHOD AND SYSTEM FOR AUTOMATICALLY MANAGING AND DISPLAYING A VISUAL REPRESENTATION OF WORKFLOW INFORMATION

(71) Applicant: Sidetrack AI, Inc., Kirkland, WA (US)

(72) Inventors: Eric A. Cheek, Jr., Seattle, WA (US); Matthew T. Wilkinson, Kirkland, WA (US)

(73) Assignee: Sidetrack AI, Inc., Kirkland, WA (US)

( * ) Notice: Subject to any disclaimer, the term of this patent is extended or adjusted under 35 U.S.C. 154(b) by 0 days.

(21) Appl. No.: 18/479,167

(22) Filed: Oct. 2, 2023

(65) Prior Publication Data

US 2024/0028997 A1 Jan. 25, 2024

Related U.S. Application Data

(63) Continuation of application No. 17/205,859, filed on Mar. 18, 2021, now Pat. No. 11,816,618.

(60) Provisional application No. 62/991,488, filed on Mar. 18, 2020.

(51) Int. Cl.

| | |
|---|---|
| G06F 3/048 | (2013.01) |
| G06F 9/54 | (2006.01) |
| G06Q 10/0633 | (2023.01) |
| G06T 3/40 | (2006.01) |
| G06T 11/20 | (2006.01) |

(52) U.S. Cl.
CPC ......... *G06Q 10/0633* (2013.01); *G06F 9/54* (2013.01); *G06T 3/40* (2013.01); *G06T 11/206* (2013.01); *G06T 2200/24* (2013.01)

(58) Field of Classification Search
CPC ......... G06Q 10/0633; G06F 9/54; G06T 3/40; G06T 11/206
See application file for complete search history.

(56) References Cited

U.S. PATENT DOCUMENTS

| | | | |
|---|---|---|---|
| 10,331,644 B2 | 6/2019 | Smart | |
| 10,410,385 B2 | 9/2019 | Banerjee et al. | |
| 11,016,650 B1* | 5/2021 | Kritzer | G06F 3/0482 |
| 11,816,618 B1* | 11/2023 | Cheek, Jr. | G06T 3/40 |
| 2017/0243382 A1 | 8/2017 | Banerjee et al. | |
| 2017/0255192 A1 | 9/2017 | Thwaites et al. | |
| 2019/0278760 A1 | 9/2019 | Smart | |
| 2022/0121460 A1* | 4/2022 | Gloystein | G06F 9/453 |
| 2023/0090050 A1 | 3/2023 | Kellner et al. | |
| 2023/0156031 A1 | 5/2023 | Subramanian et al. | |

(Continued)

OTHER PUBLICATIONS

Zhou et al., "Learining with Hypergraphs: Clustering, Classification, and Embedding", Advances in Neural Information Processing Systems 19:1601-1608 (Jan. 2006).

(Continued)

*Primary Examiner* — David Phantana-angkool
(74) *Attorney, Agent, or Firm* — Fox Rothschild LLP

(57) ABSTRACT

A workflow presentation receives electronic object from multiple sources, such as electronic messaging systems and document management systems. The system develops a hypergraph representation of the objects in which the objects appear, individually or in clusters, as edges along various rails of the hypergraph. Each rail represents a workstream to provide a visual representation of the electronic objects that are associated with one or more workstreams of a project.

22 Claims, 15 Drawing Sheets

(56) References Cited

U.S. PATENT DOCUMENTS

2024/0028997 A1* 1/2024 Cheek, Jr. ............. G06T 11/206
2024/0078727 A1* 3/2024 Brehmer ................. G06F 16/26

OTHER PUBLICATIONS

Boris, "Wave Function Collapse tips and tricks", (Feb. 8, 2020) available at https://www.boristhebrave.com/2020/02/08/wave-function-collapse-tips-and-tricks/.

* cited by examiner

METHOD AND SYSTEM FOR AUTOMATICALLY MANAGING AND DISPLAYING A VISUAL REPRESENTATION OF WORKFLOW INFORMATION

RELATED APPLICATIONS AND CLAIM OF PRIORITY

This patent document is a continuation of U.S. patent application Ser. No. 17/205,859, filed Mar. 18, 2021, which in turn claims priority to U.S. provisional patent application No. 62/991,488, filed Mar. 18, 2020. The disclosures of both priority applications are fully incorporated into this document by reference.

BACKGROUND

In modern work environments, project managers, individual workers and others must manage an ever-increasing flow of information from multiple sources. A single project may involve communications among many people, including the project team, outside vendors or customers and other stakeholders. These communications may use multiple communication platforms, including email clients, messaging services, online document creation and collaboration tools and other platforms. In addition, communications may occur within document management systems, such as in revision notes or comments. Even the status of whether or not a document was recently updated can be important to inform managers and workers of whether or not a project plan is on track to completion by a deadline.

In projects that involve multiple stakeholders and/or multiple tasks that are occurring during overlapping time periods, it can be extremely difficult for any single stakeholder to keep on top of all the communications required to understand the project's status. For individuals juggling multiple projects, the task can be impossible.

Many project management tools are available to help workers monitor the status of a project. These tools range from simple ones such as spreadsheets and to-do-lists, to more complex ones such as software tools that display timelines or Gantt charts. While such tools can be helpful for small amounts of data and straight-line workflows, they are not able to practically ingest large volumes of data without requiring the data to follow a particular format or structure, such as that coming from a single supported messaging application. Nor can they display relationships between multiple workflows that are occurring at the same time. As a result, even automated project management tools require a lot of work required to manually curate and synthesize information before sharing details of a project's development. While workplace knowledge graphs are used to ingest large volumes of structured and unstructured data and display relationships, they are unable to structure and display how these relationships evolve as a function of time, people, data, and topics. Furthermore, they are unable to display these relationships in a way that does not overwhelm the user with extraneous information, which makes sharing information through these graphs impractical without continuous manual curation.

This document describes methods and systems that are directed to solving at least some of the issues described above.

SUMMARY

In various embodiments, an electronic system implements a method of rendering a user interface for the presentation of objects that are associated with a project. In this method, a workflow management system analyzes electronic objects that are managed by various external applications during a time period. The workflow management system extracts metadata from each of the electronic objects, and it computes hypergraph data from the metadata. The hypergraph data includes nodes that corresponds to workstream timelines, people, teams, or to electronic objects that have multiple timestamps. The hypergraph data also includes edges that are associated with one or more of the nodes and that correspond to one or more of the electronic objects. The workflow management system saves the hypergraph data to a memory. When the workflow management system receives a new electronic object, it will assign a category to the new electronic object, and it will determine whether the category corresponds to one or more nodes of the hypergraph data. When the category corresponds to a node, the system may identify a timestamp for the electronic object, and it will update the hypergraph by assigning the electronic object to an edge of the corresponding node, optionally with a chronological location that corresponds to the timestamp. A workflow presentation system will cause a display device to output a graphical user interface that includes a hypergraph constructed from the hypergraph data by identifying a level of zoom to be displayed and a time frame. The presentation system will access the hypergraph data and identify a set of one or more nodes that are to be displayed at the level of zoom for the time frame. The presentation system will cause the display device to display each identified node as a rail in the hypergraph. For each identified node, the presentation system will determine which edges are to be displayed at the level of zoom, and it will cause the display device to display any edges that are to be displayed at the level of zoom.

In some embodiments, when causing the display device to display any edges and nodes that are to be displayed at the level of zoom, the system will associate one or more pins with each edge and node that is to be displayed. It may then output each pin with an actuator that, when selected, will cause an electronic device of which the user interface is a component to display the object via an application that generated the electronic object to which the edge associated with the pin is assigned. The actuator may include, for example, a hyperlink that contains an address of the electronic object to which the edge is assigned.

In some embodiments, the workflow management system may, for each electronic object that is associated with an edge, determine a rank for the edge. For each identified node, when determining which edges are to be displayed at the level of zoom, the system may assess the ranks of all edges of the identified node and use the ranks to determine which edges are to be displayed at the level of zoom.

In some embodiments, the workflow management system may associate one or more compressed context representations with one or more of the electronic objects that are assigned to hypergraph data, and therefore assign one or more compressed context representations to one or more nodes, edges or pins of the graph.

In some embodiments, when assigning a category to the electronic object, the system may perform named-entity recognition on the object and associate the electronic object with a category that is semantically related to a recognized named entity of the object.

The workflow presentation system also may update the hypergraph in response to user input.

In some embodiments, the workflow management system may generate a compressed context representation and assigning at least some of the electronic objects to the compressed context representation. If so, as well as in other situations, the workflow management system may then compute new compressed context representations from navigations within an application, across multiple applications, or both.

In various embodiments, the workflow management system may analyze new electronic objects that are managed by the plurality of external applications over a new time period. When this happens, the system may determine that a rate of receipt of the new electronic objects over the new time period exceeds the rate of receipt of electronic objects over prior time periods by at least a threshold amount. In response, the system may adjust a scale of the new time period for display as compared to the prior time periods.

In some embodiments, the workflow management system may analyze new electronic objects that are managed by the external applications over a new time period. The system may determine that a rate of receipt of the new electronic objects over the new time period exceeds the rate of receipt of electronic objects over prior time periods by at least a threshold amount. When this happens, then in response the system may determine that a new node should be created for at least some of the new electronic objects, and it may update the hypergraph data to include the new node.

In various embodiments, compressed contextual relationships may be associated with a code that is shared via an electronic message, metadata, or physical object to enable retrieval of contextual updates relevant to each object that is associated with the compressed contextual relationship.

In various embodiments, at least some of the electronic objects may be messages transferred via a messaging application, audio files or video files.

In some embodiments, the workflow management system may associate a compressed context representation with one or more of the electronic objects, and it may enabling a user to share a subgraph of a hypergraph with another user by sharing a reference to the compressed context representation of an electronic object that is represented in the hypergraph. When the other user accesses the hypergraph, the system may determine a display layout to present details from the hypergraph that are relevant to the other user's context and access permissions. Before sharing the hypergraph with the other user, the system may include an abstract polynomial lattice encoding with the contextual context representation, wherein the abstract polynomial lattice encoding indicates subpartions of the hypergraph to share or exclude from sharing.

In various embodiments, the workflow management system may receive a set of search parameters from a user, along with a subscription request. The system may then periodically examine the hypergraph data as new objects are received to determine when the hypergraph data includes a new electronic object that corresponds to the search parameters. Upon determining that the hypergraph data includes a new electronic object that corresponds to the search parameters, the system may notify the user that a subscription update is available.

In various embodiments, the system may display a subgraph in a waveform based on included event times, and it may embed one or more such waveforms in a compressed context representation. The system may then use those waveforms to rank and filter search query results according to temporal constraints.

In various embodiments, at least some of the nodes correspond to a timeline for one or more of the workstreams.

In various embodiments, the workflow management system may receive a user input identifying a workstream that can be a template for a target workstream. Alternatively, the system may compare candidate compressed context representations to automatically detect workstreams having similar density embeddings, and it may use one or more of the detected workstreams as a template for the target workstream. In response, the system may generate a compressed context representation for the target workstream and, when doing so, add a compressed context representation for the identified or detected workstream as a field within the compressed context representation of the target workstream.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

Additional terms that are relevant to this disclosure will be defined in the discussion of FIGS. 2 and 3 below, as well as at the end of this Detailed Description section.

Figure 1:
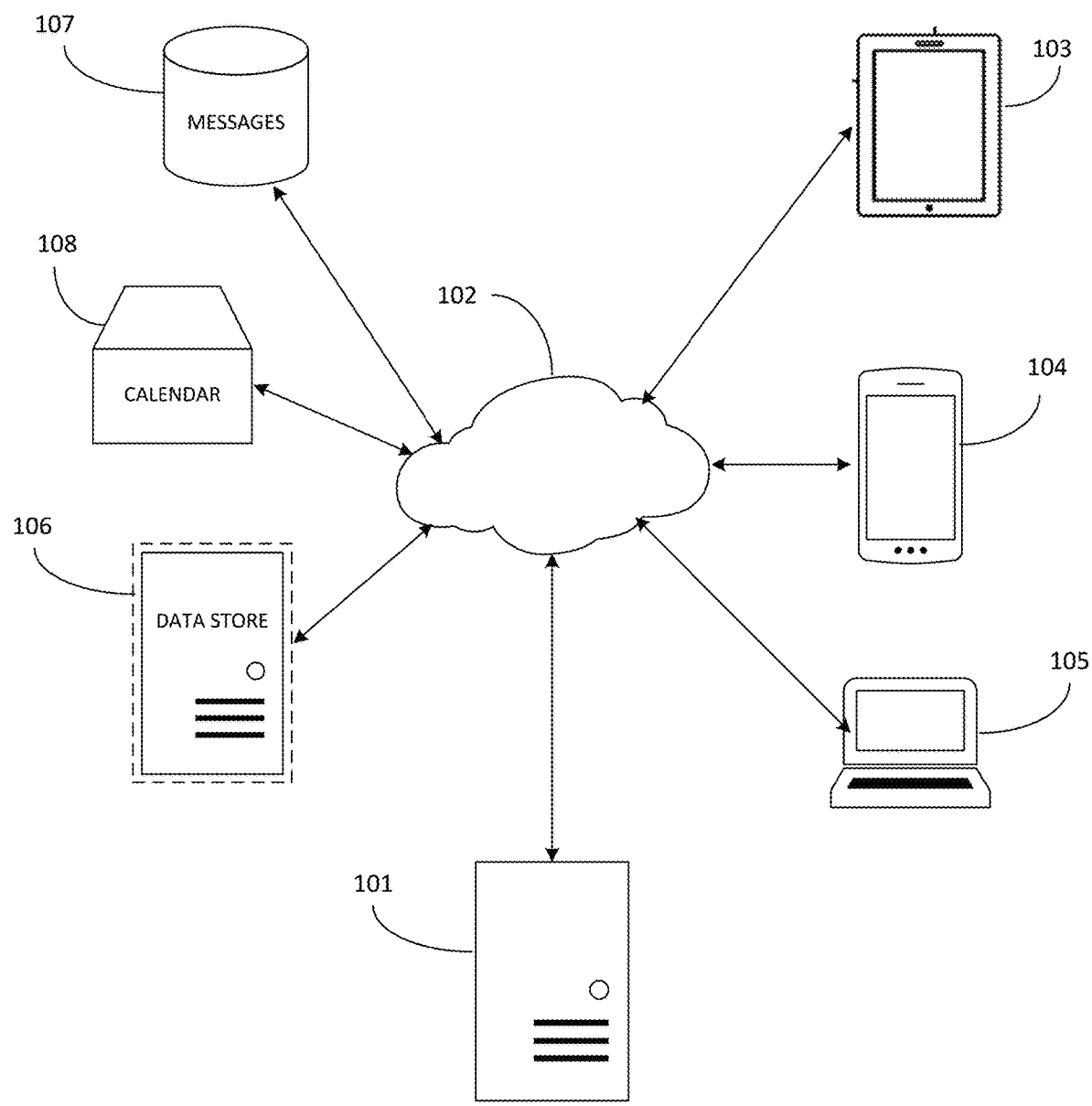
FIG. 1 illustrates several components that a workflow presentation system may include or access, or to which the system may direct communications.

This document describes methods and systems for automatically ingesting, analyzing and determining associations among information received from disparate electronic systems and applications, and for presenting a visual representation of that information in the form of a hypergraph as it relates to one or more process workflows. FIG. 1 illustrates several elements of a system that may employ the methods described in this document. A server 101 is a computing device with a processor that executes programming instructions that are stored on a local or external memory device. The server 101 performs the function of a workflow management system in that it ingests, analyzes and determines associations among information that it stores and/or receives from other components of a system. It also serves as a workflow presentation system in that it generates the visual representation that will be displayed on user interfaces of one or more electronic devices. The server 101 may be a cloud-based server that it is in communication with other system components via a network 102, or it may be a component of any of the other system elements described below, or it may be distributed across multiple of these or other system elements. Different servers or the same server may provide the functions of workflow management and workflow presentation.

Any number of users of the system may access the system via one more user computing devices 103-105. Users may include project managers, workers on a project or other stakeholders who need to monitor and/or participate in a workflow. At least some of the user computing devices 103-105 will include display devices on which the user interfaces of the system may be displayed. The user computing devices 103-105 that have displays also may have an installed system-specific software application that generates the user interface, or a browser or other general application that outputs the user interface as generated by a remote server 101.

Other elements of the system may include any number of document management systems 106 and/or electronic messaging systems 107. A document management system 106 will include a data store of electronic documents and metadata associated with each document such as version number, author ID, editor ID, time/date of edits made and other metadata. An electronic messaging system 107 will include a data store of electronic messages sent and received by the system. Each message may include a header that includes, and/or be associated with, metadata associated with each message such as sender ID, recipient ID, time/date sent or received, and other metadata. Optionally, the system also may access one or more calendar systems 108 that include a data store of events with associated dates and times. The document management systems 106, electronic messaging systems 107 and/or calendar systems 108 may be software applications and memory sectors that are part of the server 101 or any user computing device 103-105, or they may be stand-alone systems that are in communication with other components via one or more communication networks. Other applications, such as those that manage, process and/or store audio and/or video files, also may be part of the system.

The system also may include or have access to any number of other subsystems on which information is stored, updated or shared. For example, one of the subsystems may include a browser application installed on an electronic device, and the browser may include history data that archives the addresses of web pages that the user accessed via the browser, along with a day and/or time of such access. Another subsystem may include a video and/or audio media server that stores media files, or other structured data sets.

In this context of this disclosure, the term "graph" refers to the mathematical concept of network that includes edges and nodes. A "node" is a representation of an item that is associated with multiple objects over a time period. For example, a node may represent a workstream, which is a data set that describes the progressive completion of tasks that are to be completed by different groups or individuals who are stakeholders in a single project. A node may represent a person or team and include details about that person or team's activity over time. A node also may be associated with an object having multiple sub-objects with multiple timestamps, such as a file folder or a document having multiple versions. An "edge" is a connection between nodes, which may correspond to an event such as an electronic message or meeting. A "hypergraph" is a type of graph in which each edge can connect to any number of nodes. (By way of comparison, in a traditional graph each edge connects to only two nodes. Hypergraphs correspond to rectangular matrices, while ordinary graphs correspond to square matrices.) A "pin" represents the point of intersection of an edge with a node in a hypergraph. A "subgraph" is a subset of the edges and nodes of a graph, which in this document may be a subset of the edges and nodes of a hypergraph.

Figure 2:
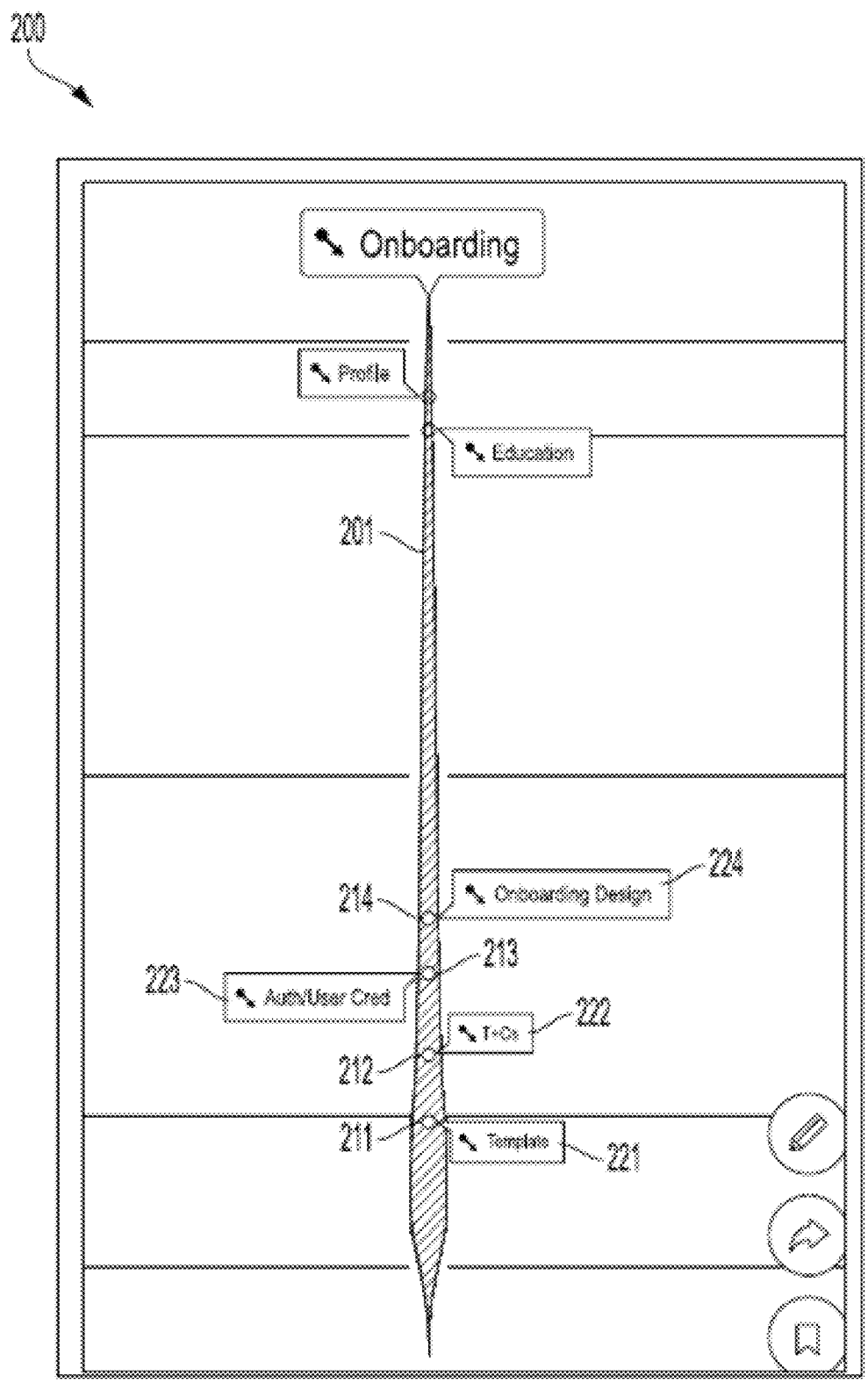
FIG. 2 illustrates an example user interface screen of a workflow presentation system that is displaying a high-level hypergraph representation of a workflow.

FIG. 2 illustrates an example user interface 200 that displays workflow information in the form of a map that the system stores as a hypergraph. In FIG. 2, a node 201 of a hypergraph is presented in the visual form of a rail that is a timeline of tasks that are part of completing an onboarding process workstream. The rail of node 201 is rendered vertically starting from the bottom of the screen to the top in FIG. 2, but the invention is not limited to such an arrangement, as horizontal and/or top-to-bottom arrangements are also possible. The node(s) displayed will be associated with a time period that may depend on a level at which the graph is zoomed in or out, as will be described below.

Each node (such as node 201) includes any number of pins 211-214, each of which represents the intersection of one or more events (i.e., electronic objects) in the workstream with one or more nodes. Example pinned events include: e-mails or other electronic messages; calendared meetings; browser history entries; document, data set or audio or video media file versions or updates; and collections of any of these or other categories of events. In FIG. 2, pin 211 corresponds to a template development event 221, pin 212 corresponds to a terms and conditions development event 222, pin 213 corresponds to a user authorization/credential assignment event 223, and pin 214 corresponds to an onboarding design event 224. Some pins may be positioned at an edge, as the pinned event may lead to its own node when the display is zoomed in. Other pins may simply be positioned along a node and do not correspond to an edge; such pins will not intersect another node when zoomed in. Some pins (such as those shown in FIG. 2) may be associated with edges where they are the only pin. Other pins overlap each other as a single edge may have different pins for different nodes, and a single node may have multiple pins for multiple edges.

The user interface 200 includes a feature that enables a user to interact with the graph by zooming in or out. The user interface may include one or more actuators that enable the user to zoom the map in for more detail within a smaller time period or out for less detail over a larger time period.

Example actuators include a "+" button to zoom in and a "−" button to zoom out, a slider, and/or touchscreen functions such as those that zoom out by moving two fingers apart and zoom in by moving two fingers together. As the system zooms in or out, the system will assign a level (or scale) to the zoom factor with respect to a default level. For example, the illustration of FIG. 2 may be considered to be a 100% scale; zooming in may take the scale to 110%, 120% or higher; zooming out may take the scale to 90%, 80% or lower.

Figure 3:
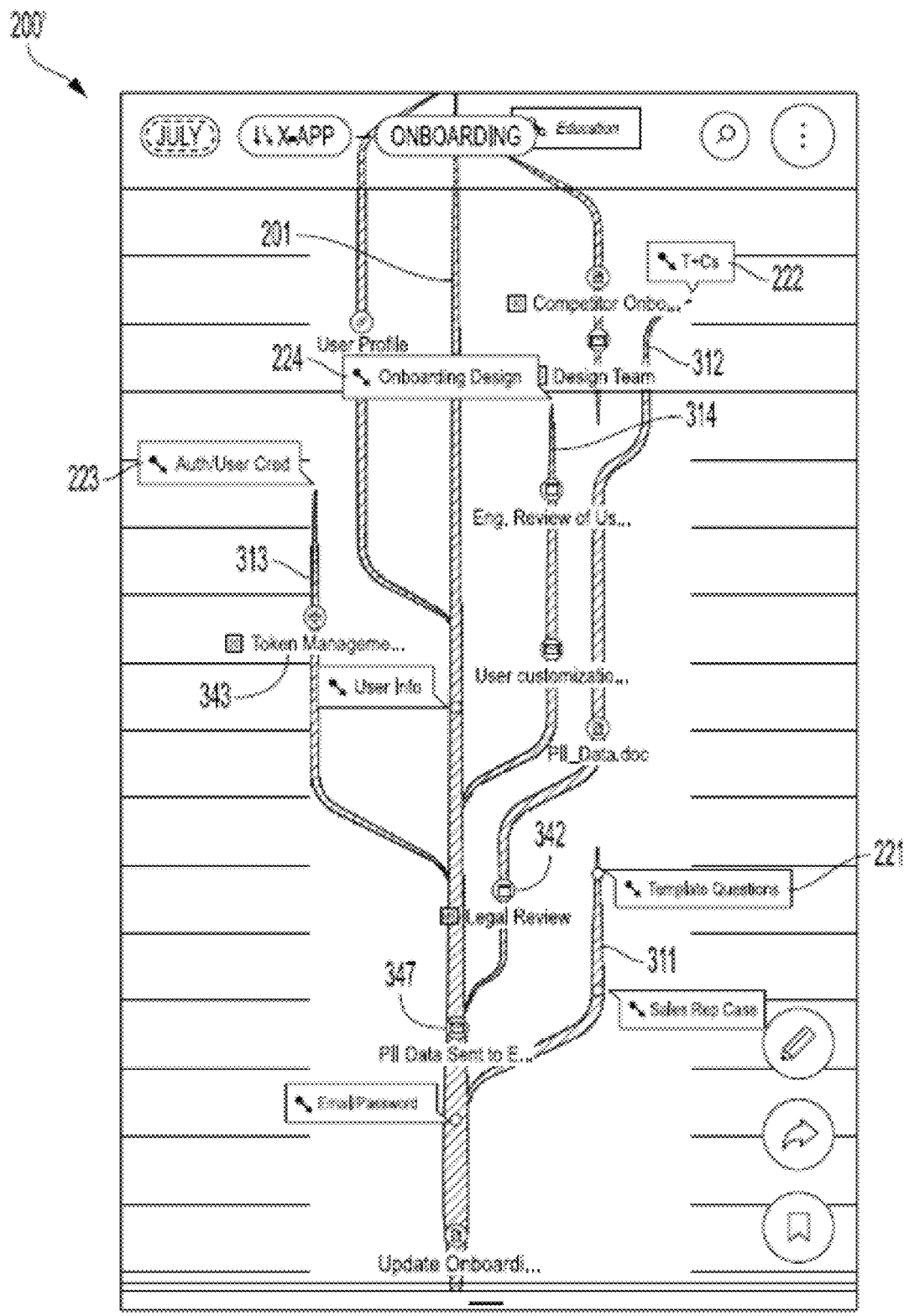
FIG. 3 illustrates a second level of the user interface of FIG. 2, in which the hypergraph has been zoomed in to reveal additional edges and nodes.

FIG. 3 illustrates an example of how the user interface 200' may change after a user has selected a zoom in function. The concepts of "folding" and "unfolding" a hypergraph are useful to explain the changes between FIGS. 2 and 3. A "fold" is an operation that transforms a hypergraph by combining multiple nodes and edges, thus mapping a smaller (i.e., more close-up and thus more detailed) hypergraph to a larger (i.e., a relatively higher level) hypergraph. An "unfold," which is the opposite of a fold, is an operation that maps a relatively larger hypergraph to a relatively smaller one by breaking one or more nodes and edges of a hypergraph into multiple nodes and edges. Traditional point-node graphs support two aggregation operations: (i) node contraction, which is combining nodes and eliminating edges between them from the representation; and (ii) edge extension, which is the concept that a trip from edges A→B→C also describes a trip from edges A→C. In hypergraphs, these operations can be generalized into the symmetric edge and node combination operations of: (a) node folding (combining two or more nodes into an aggregate node); and (b) edge folding (combining two or more edges into an aggregate edge). Both folding and unfolding induce operations on pins. Combining edges and nodes can make some pins redundant, as they may overlap in the resulting hypergraph. Various kinds of data associated with pins must be combined in a coherent way. Folding and unfolding enable the system to model overlapping substructures of a hypergraph, and to embed subgraphs within higher-level graphs, this allowing a user to dynamically fold and unfold content without overwhelming the display with information at any one time.

Figure 6:
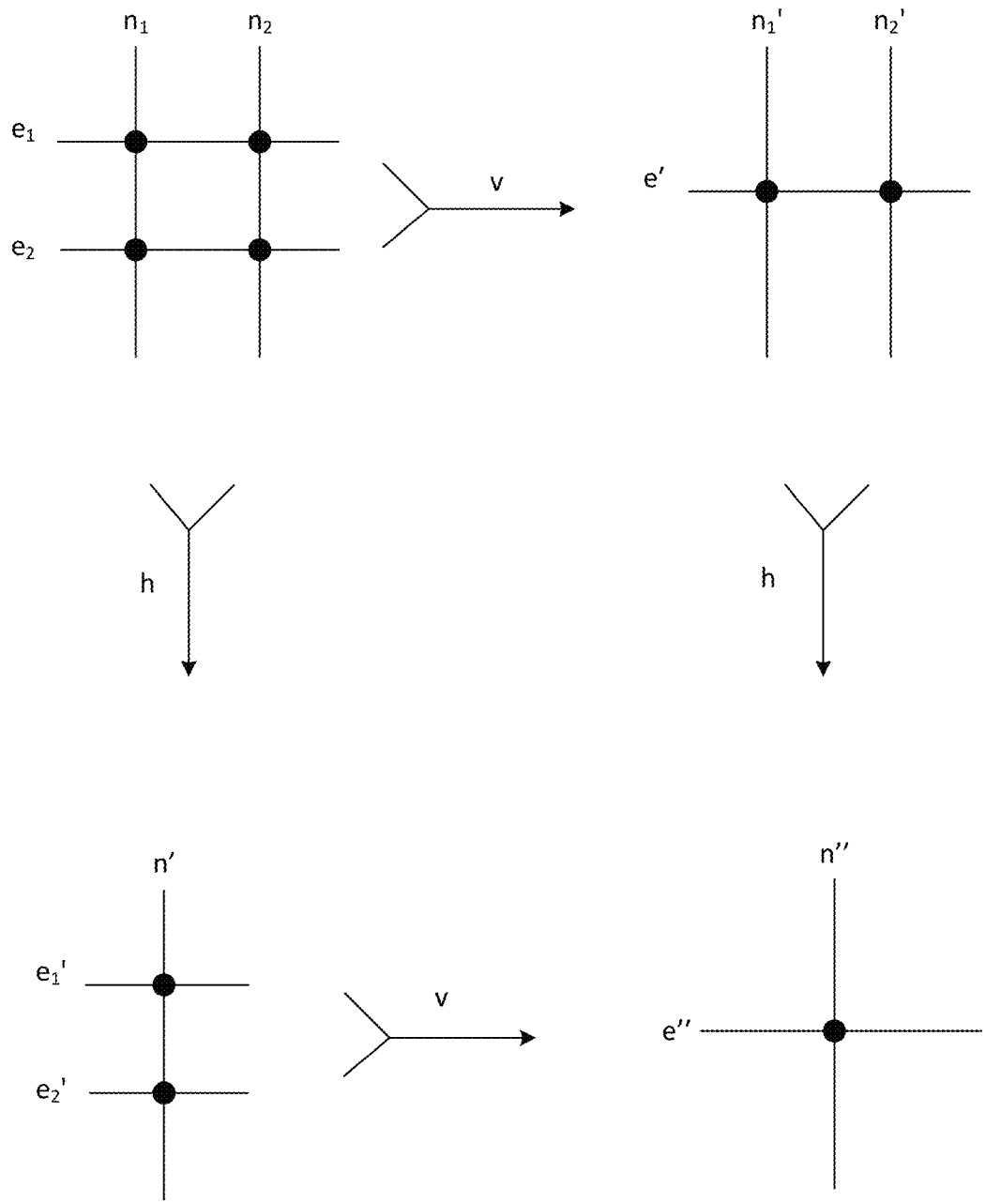
FIG. 6 illustrates an example hypergraph folding process.

The process of folding creates vertices v based on either the nodes or the edges of the original graph, and it also connects nodes in the new graph if their corresponding nodes/edges share a connection with a common edge/node. Generally, hypergraph folds are composed of two operations: a map of v: E→E' in which multiple edges E are combined into a new edge E', and a map of h: N→N' in which multiple nodes N are combined into a new node N'. This can be represented as the matrix multiplication H'=$F_{E \to E'}$, $HF_{N \to N'}$, which is illustrated in FIG. 6 in which the fold=v o h, where "o" represents function composition.

Standard graphs (which are sometimes referred to as 2-graphs) have a known matrix representation known as an adjacency matrix. This is sometimes extended to hypergraphs, in which the matrix is known as an incidence matrix. In the present embodiments, an incidence matrix may be used to algebraically implement the folding and unfolding process. Consider an example hypergraph incidence match in which the nodes correspond to columns and the edges correspond to rows:

$$H = \begin{vmatrix} 1 & 1 & 0 & 1 \\ 1 & 0 & 1 & 1 \\ 1 & 0 & 1 & 0 \end{vmatrix}$$

In this example a binary incidence matrix describes relations of three edges and four nodes.

With this representation, folding may occur as a matrix multiplication on the left for edge-folding and a multiplication on the right for node-folding:

$$H_{folded} = F_{edges} \circ H \circ F_{nodes}$$

$$H_{folded} = \begin{vmatrix} 1 & 1 & 0 \\ 0 & 0 & 1 \end{vmatrix} \circ \begin{vmatrix} 1 & 1 & 0 & 1 \\ 1 & 0 & 1 & 1 \\ 1 & 0 & 1 & 0 \end{vmatrix} \circ \begin{vmatrix} 1 & 0 & 0 \\ 0 & 1 & 0 \\ 0 & 0 & 1 \\ 0 & 0 & 1 \end{vmatrix}$$

$$H_{binary} = \begin{vmatrix} 1 & 1 & 0 \\ 0 & 0 & 1 \end{vmatrix}$$

$$H_{integer} = \begin{vmatrix} 2 & 1 & 3 \\ 1 & 0 & 1 \end{vmatrix}$$

The matrix labeled H binary is the result of matrix "multiplication" with logical "AND" operation instead of multiplication to compute a binary incidence matrix. The matrix labeled $H_{integr}$ performs ordinary matrix multiplication over scalar integer cells, with the result counting the number of pins from the combined edges.

In some embodiments, the system may associate non-scalar data with hypergraph edges, nodes, and pins. One way of achieving this is to use symbolic mathematical manipulation tools (such as the software library known as "Sympy") to model hypergraphs as matrices over symbolic polynomials. Metadata can be tracked by associating it with symbolic variables that can be interpreted even after operations such as folding. Given an incidence matrix, the system may label pins by multiplying on the left and right by symbolic, diagonal, labeling matrices for the edges and nodes, respectively:

$$H_{sym} = L_{edges} \circ H \circ L_{nodes}$$

$$H_{sym} =$$

$$\begin{vmatrix} e_1 & 0 & 0 \\ 0 & e_2 & 0 \\ 0 & 0 & e_3 \end{vmatrix} \circ \begin{vmatrix} 1 & 1 & 0 & 1 \\ 1 & 0 & 1 & 1 \\ 1 & 0 & 1 & 0 \end{vmatrix} \circ \begin{vmatrix} n_1 & 0 & 0 & 0 \\ 0 & n_2 & 0 & 0 \\ 0 & 0 & n_3 & 0 \\ 0 & 0 & 0 & n_4 \end{vmatrix} = \begin{vmatrix} e_1 n_1 & e_1 n_2 & 0 & e_1 n_4 \\ e_2 n_1 & 0 & e_2 n_3 & e_2 n_4 \\ e_3 n_1 & 0 & e_3 n_3 & 0 \end{vmatrix}$$

The system may then consider folding a hypergraph represented as a symbolic matrix:

$$H_{foldsym} =$$

$$F_{edges} \circ H_{sym} \circ F_{nodes} = \begin{vmatrix} (e_1 n_1 + e_2 n_1) & (e_1 n_2) & (e_2 n_3 + e_1 n_4 + e_2 n_4) \\ e_3 n_1 & 0 & e_3 n_3 \end{vmatrix}$$

The entries of the resulting $H_{foldsym}$ matrix are polynomials of labeling symbols. Note how the number of terms added to form the polynomial corresponds to the number of pins counted in $H_{integer}$, for example the cell with value 3 corresponds to the three terms added in the symbolic polynomial ($e_2 n_3 + e_1 n_4 + e_2 n_4$). Moreover, note that the symbolic representation can be unfolded, we can say specifically where each folded pin originated. We can also separate the combined edges $e_1$ and $e_2$ (and/or combined nodes) by taking a partial derivative with respect to their symbols to recover the original sets of incident nodes. Note that we can also introduce labels after folds to label aggregate edges.

Compressed Concept Representations

While the process above can be used, other processes can also be used. For example, density matrix embeddings may be used to model aggregates, such that when combined with embedding dimensionality reduction techniques, the size of the aggregate representation remains small relative to the number of items included in the aggregate. The density matrix approach is a key component enabling a "Compressed Context Representation" (CCR). A CCR is a data structure representing a subgraph of a hypergraph, with several components including metadata about the origin hypergraph, edges and nodes in the subgraph, relationships within and between subgraphs, temporal structure, as well as metadata to manage updates and access controls.

Every electronic object (document, message, event, workstream, user) or set of electronic objects that the system receives may have one or more CCRs associated with it, representing a context associated with the electronic object(s). CCRs are enabled by density matrix embeddings of hypergraph structure, density matrix embeddings of temporal waveforms, lattice-based partition controls, and encryption and signing protocols. CCR uses a hierarchical data structure with one or more fields, including metadata, density matrices or tensors, and in some cases sub-CCRs for one or more subgraphs. CCRs may be serialized using standard data serialization techniques such as JSON, as shown by way of example below:

```
CompressedContextRepresentation {
  version: integer
  identifier: UUID
  generated-by: (UUID, Cryptographic Signature)
  densities: [Matrix]
  total_items: integer
  full_timerange: (min timestamp, max timestamp)
  updates_url: URL
  ... # other representations and metadata
}
```

To compute density matrix embeddings, distinct types of source data (including text, tabular data, hierarchical data, audio, video, time series signals, source code and graph structures) are embedded into vector representations via natural language processing (NLP) embedding techniques, graph embedding techniques, and other standard deep neural network techniques. The system may subdivide input structures prior to embedding, for example, representing every paragraph or sentence within a document as a separate unit of data for embedding. The system may apply further dimensionality reduction techniques such as random embedding to these initial embeddings. Next the system may compute a density matrix as the outer product of a (possibly reduced dimensionality) embedding vector with itself (a self-outer product). When this vector represents an embedding of some data, the density matrix may be referred to as a density embedding of that data.

Figure 14:
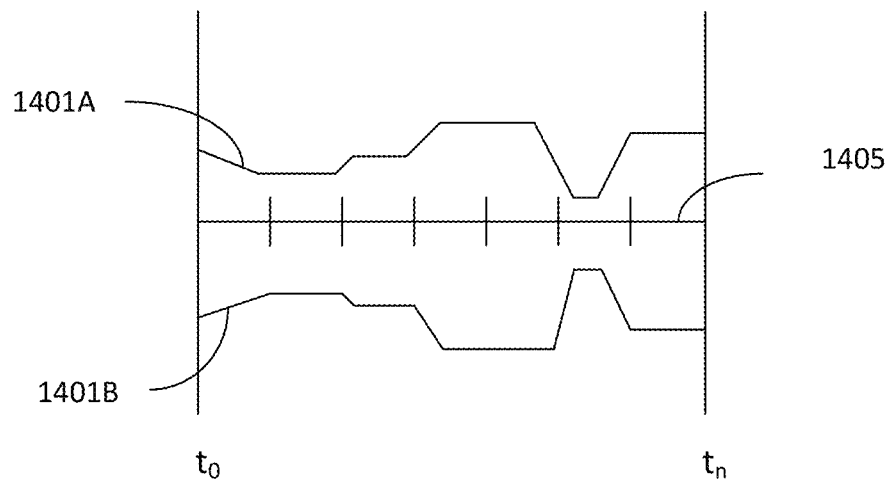
FIG. 14 illustrates an example waveform representation of events over a period of time.

In order to represent temporal waveforms as part of a CCR, the system determines a partitioning of time using a tempo algorithm, which will be described in more detail below. Given a time partitioning, the system computes a waveform for the events in a timeline (representing a node, subgraph) by associating each partition with an index of a numeric vector to count the number of events. An example of this is shown in FIG. 14, in which a waveform represented by boundaries 1401A and 1401B reflects activity during each of several discrete time steps over a period of time 1405 from time $t_0$ to time $t_n$. The outer product of the waveform vector is a density embedding of the waveform. In some scenarios, the system may multiply a waveform density embedding by an equivalent sized density embedding representing some semantic context, enabling many combined semantic/temporal inference tasks via the Born Rule. For example, questions such as "When is Bob active on workstream X?" and "Who was active in workstream X last week?" may be encoded as density matrices representing a measurement (in the sense of quantum mechanics) and computed via the trace of the product of measurement matrix and the density matrix representing the workstream.

Waveforms may also be used to represent events in the future (scheduled calendar events). In some embodiments the future waveform may be embedded or stored separately from the past waveform. Due to the imbalance between level of detail of past events and future events, tempo partitioning algorithms may be inadequate for the future, instead a constant number of partitions are allocated with each partition representing an exponential step in a interval length (first future partition is 1 hour, second is 2 hours, etc). Users may "snooze" (i.e., temporarily not display) pins or workstreams by specifying one or more possibly recurring time periods during which the workstream should be brought back to attention (for example, via mobile notification), or revealed in a particular context. Distant past events may also be distributed over a constant number of exponential intervals partitions.

In some cases, particularly for long-lived or public CCRs, the system may use a common waveform timestep and range for comparability. In these cases, the waveform may be relative to a long time period with a fixed number of time slices.

Random walks over hypergraphs propagate the structural graph context by merging density embeddings for nodes, edges, or pins encountered in random walk steps. This will be described in more detail in the discussion of FIG. 8 below. This may also be achieved by transductive inference on hypergraphs. These algorithms ensure density matrix components in CCR reflect not just the content but context of items.

For some uses such as access control, explicit structure may be required to ensure security restrictions are enforced. In this case, the system may use techniques such as the symbolic hypergraph to model access controls at the granularity of workstreams. A CCR may include an abstract polynomial lattice encoding (for example, via a symbolic hypergraph or finite field polynomials) which indicates subpartitions of a hypergraph that should be included, excluded when collecting or updating information about a particular context. This data may be combined with cryptographic tools such as public-key encryption and cryptographic signatures to protect the integrity of permission grants as CCRs are passed through various systems and physical embodiments (for example, quick response (QR) codes).

CCRs are used to rank items in the hypergraph visual layout process and summary waveforms of aggregated temporal activity. Given a CCR corresponding to a workstream or pin, and CCRs for documents, label phrases, people, the system may rank or select these by computing the trace of the product of the density matrices corresponding to the waveform and items of interest such as a label keyphrase.

Referring to FIG. 14, visually displayed waveform shapes (represented by boundaries 1401A and 1401B) are computed as offsets from a center track line 1405 layout where where the offsets reflect the temporal activity of a discrete time step. (Note that timesteps may not be equal sized, following tempo partitioning.)

Figure 15:
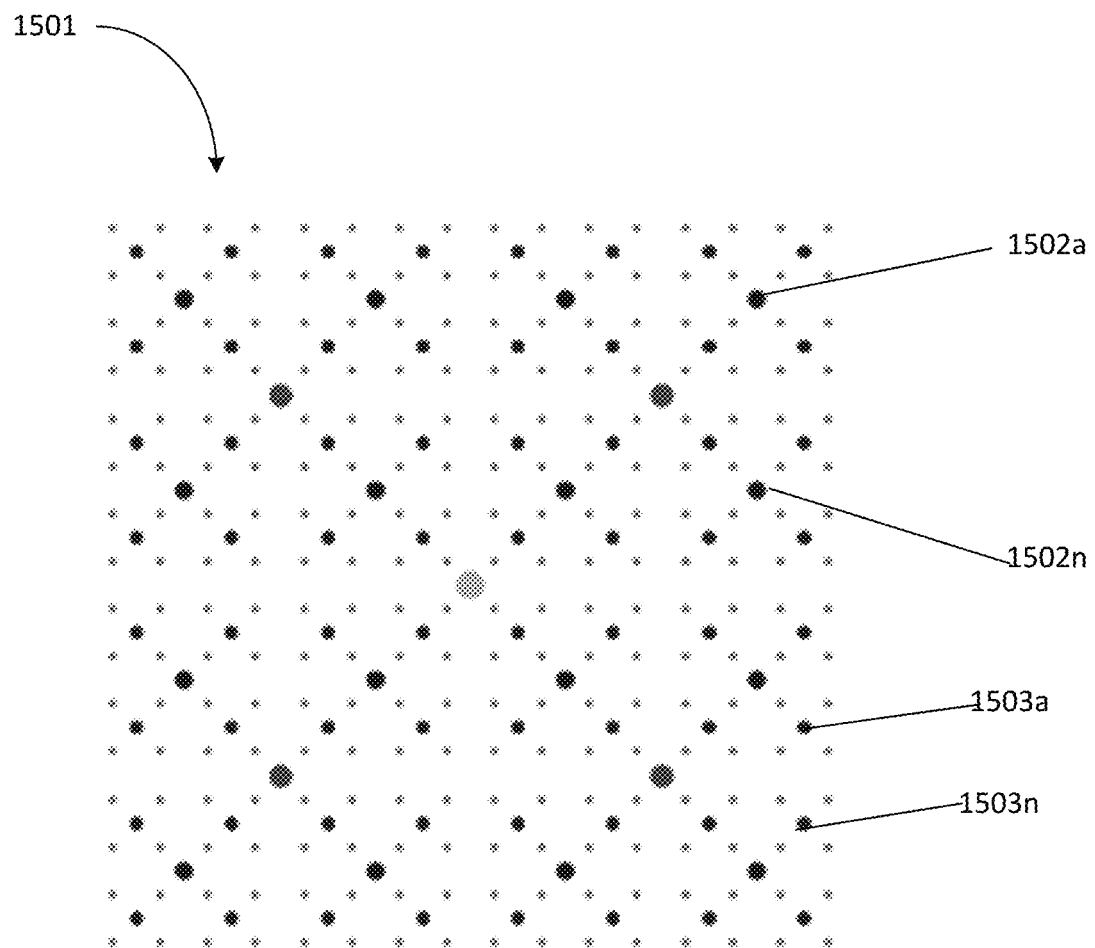
FIG. 15 illustrates an isometric grid that is part of a fractal used in the process of logical layout of hypergraph visualization, where each point in the grid may be associated with a compressed context representation.

CCRs can be merged with other CCRs to form an aggregate, or split into multiple CCRs by performing appropriate operations on subcomponents. In particular, density matrix subcomponents may be merged via matrix addition, and may be split into one or more components via spectral cut algorithms. Referring to FIG. 15, the system may store CCRs in a data structure corresponding to an isometric fractal 1501, or a grid having a pattern that repeats itself at various scales. During the layout process, the system may choose to split a workstream or merge a pair of workstreams, which involves merging or splitting the underlying CCRs. Some data fields within a CCR (for example a creation timestamp) are not directly merged or split, but replaced or updated in the resulting form. Depending on the scale at the level of zoom selected (as adjusted by tempo partitions), an individual CCRs 1503a . . . 1503n or a merged CCRs 1505a . . . 1505n may appear and have corresponding objects that will be displayed at the appropriate level of zoom.

CCRs enable efficient data retrieval and transmission by allowing a client to request updates relevant to one or more subgraphs without transmitting the full list of items in those subgraphs. A tracker is a data storage and indexing system (in some embodiments, a database, application programming interface (API) server, or blockchain) including a memory device that maintains one or more hypergraphs in storage and allows updates from one or more sources. A tracker receives requests for data or updates that may include CCRs, these CCRs are used to filter hypergraph data to a subgraph for inclusion in a query response, or to filter updates to then forward to subscribers, or to allow one user to share a subgraph with another user without necessarily sharing the entire hypergraph. CCRs for elements of the index hypergraph are compared to CCRs for requests via the trace of density matrix products. Waveforms included in density embeddings enable temporal queries and filters via CCRs. In some embodiments, a tracker may transmit only a delta or change to a CCR, for instance consisting only of a sparse positive and negative adjustment to a density matrix to reduce the transmission overhead and latency for updates as compared with transmission of an entire CCR.

In some operations such as splitting a workstream, not all desired information about an object is accurately encoded in the approximation of an aggregate CCR. Indirectly derived CCRs may be lower fidelity depending on their construction, but may be refreshed to higher fidelity by requesting detail from a tracker which constructs a new CCR from underlying hypergraph or other higher fidelity CCRs representing subgraphs within or related to the request CCR.

CCRs may be updated by user interaction, and/or in response to receipt of a user action querying or subscribing to a tracker server that maintains a hypergraph index for updates from other systems or users. Search, zoom, pan actions send queries or subscription requests including CCR to a tracker to reflect the context of interest displayed near or around the current user view. Edit, share actions updates including CCRs to a tracker. Users may also maintain a CCR describing their recent activities, including recent searches, recent actions within applications, or other context such as physical location. The system may include CCRs as a component of search queries to give more contextually relevant results higher ranking. The system may exclude other less relevant results from the subgraph data and CCRs returned in response to a query, or subgraph data that one user shares with another user. When provided with a CCR in a search query, the system may use waveforms included in the CCR to selectively rank or filter results based on temporal constraints encoded as one or more waveform density matrices. The system may apply the Born Rule to compare waveform density matrices of the query and items in a stored hypergraph.

CCRs may reflect changes made in isolated networks or offline and facilitate later synchronization and merging of divergent subgraphs. CCRs can be shared by associating the CCR with a numeric, textual or graphic code, such as a QR code, barcode or other visual code, or a uniform resource locator (URL) or other address that is included in a message or printed on an object, and sharing the code in one or more of multiple ways, such as: in document metadata; in message headers; as data in an RFID tag; as data in a digital watermark or fingerprint identifier embedded in image, audio, or video data; or by other means. By sharing a reference to a CCR, users can share with other users access to hypergraphs (fully or as subgraphs) that contain objects associated with the CCR. When the recipient user then accesses the hypergraph via the CCR, the system may then cause the system determines a display layout that will display details of the hypergraph that are relevant to the receiving user's context and/or access permissions, using display computational processes described throughout this document. Users can add a shared CCR to a new context to include past and future updates. This enables the system to track context through external applications and offline or physical processes, and allows users to request updated context related to a static item. Some physical objects may have identifiers supplied by external systems that can be detected and associated with one or more workstream CCRs in the same manner as other electronic objects. A user may request that the system generate a CCR that is associated with one or more workstream CCRs and incorporate the data of this CCR in a visual QR code label, RFID tag, or other marker that may be attached to physical objects and enable later recovery of the associated CCR. The system may generate a random vector and add its self-outer product to the density embedding component of a CCR as a unique placeholder for the unknown external object.

CCRs can be used to guide and track recurring but not necessarily explicitly defined processes. The system may detect similar workstreams by detecting that the workstreams have similar density embeddings, or a user may instruct the system to pin a workstream as a "template" for another workstream. When this happens, the system adds a CCR for the template workstream as a field within the CCR of the target workstream. During various ranking and clustering steps, the system may use ranking against the template or use similarities between candidate sub-workstreams and the template to influence the placement and other visual display details such as labels, icons, and key people. Waveforms enable the system to make inferences about the order, dependence, and relative timing of steps to influence ranking of items relevant at distinct times, prompt workstream participants to take predicted next actions, or in some instances automatically perform actions (such as sending a message or making an API request to an external system).

Density Matrices, the Born Rule, and Quantum Relative Entropy

The Born Rule is the basic link between density matrices and classical probability theory. Borrowing the interpretation of von Neumann measurement, the Born Rule gives the classical probability of measuring an observable density matrix and a given state density matrix (note symmetry between "observable" and "state") by computing the trace of the product of the inputs:

$$\text{Prob}(A\backslash B)=Tr(D_A \circ D_B)$$

The system may use a variety of algorithms originally developed in the context of quantum information theory. These algorithms can be particularly useful due to the system's use of density-based embeddings of hypergraph structures. In particular, the system may consider the Quantum Relative Entropy between density matrices D1, D2:

$$QRE(D_1,D_2)=Tr(D_1(\log D_1 - \log D_2))$$

FIG. 3 illustrates that as the user interface implements a command to zoom in, template development event 221 now has its own node 311, terms and conditions development event 222 has node 312, user authorization/credential assignment event 223 has node 313, and onboarding design event 224 has node 311. The process of unfolding may reveal new edges (represented by pins) in at least some of the new nodes. Each new edge corresponds to one or more events along the new node such as: (i) pin 343 which corresponds to token management, which is an edge of the user authorization/credential assignment node 313; and (ii) and pin 342 which corresponds to a legal review meeting, which is an edge of the terms and conditions development node 312. The folding and unfolding process will be described in more detail below in the context of FIGS. 4 and 9.

To determine which nodes, edges and pins to display at a given zoom scale, the system may employ a ranking process to rank each of these features. Ranking each of these features can help the system decide what to display when there is a potential inconsistency at the pin level (to balance, for example, the rank of a pin on a high-rank node and low-rank edge). The ranking process may include at least two elements: (i) relative ranking, which is relative to a subgraph and thus useful in determining how important a particular event is to a workstream or how relevant one workstream is to another; and (ii) global ranking, which is an assigned priority with respect to all other nodes, edges, and/or pins in a hypergraph. The system's development and use of rankings will be described below and in the discussion of FIG. 8.

Graph and Hypergraph Learning and Inference. To rank features and determine which nodes, edges and pins to display at a given zoom scale, the system may use several graph inference algorithms, particularly variants adapted to hypergraphs. Examples of known algorithms include those known as hypergraph Laplacian, hypergraph spectral cut (used in workstream extraction), transductive inference on hypergraphs (used to propagate labels). These and other graph inference algorithms are disclosed in Zhou, Huang, and Scholkopf, "Learning with Hypergraphs: Clustering, Classification and Embedding" (2007).

Many of the algorithms discussed above focus on inference for only nodes (or only edges symmetrically). In operation, the system requires inference over both nodes and edges. To enable this, the present embodiments may use spectral biclustering instead of (or in addition to) a simple clustering approach to simultaneously identify workstream candidates and associated items.

The system may implement algorithms for graph and hypergraph random walk to allow for analysis of node and edge distributions.

An example hypergraph random walk algorithm is described below:

```
Input:
- Hypergraph pin incidence matrix 'X' (optionally with scalar -1 to 1 pin weights)
- Vector of initial edge weight 'EW' distribution (length equal to number of rows in X)
- Vector of initial node weight 'NW' distribution (length equal to number of columns in X)
- Max number of random walk iterations 'max_steps'
- Floating-point scalars min edge delta 'eps_edges', min node delta 'eps_nodes'
Output:
- Vectors for final edge and node weight distributions.
Let
steps = 0
while steps < max_steps:
        steps = steps + 1
        NW' = matmul(EW, X)
        EW' = matmul(transpose(X), NW)
        NW" = matmul(EW', X)
        EW" = matmul(transpose(X), NW')
        EW = EW"
        NW = NW"
        if magnitude(NW"-NW) < eps_nodes or magnitude(EW"-EW) < eps_edges:
                break
return EW, NW
```

Variations of this algorithm may include:
Alternative stopping conditions such as based on the rate of change (or via entropy or information tools like Kullback Leibler divergence and Quantum Relative Entropy);
Normalizing or restricting the number of nodes/edges modified in each step;
Propagating multiple weights as above enables transductive inference between embeddings, replacing the weight vectors above with matrices (for example, to propagate context between density matrix embeddings within a CCR);
Variants which may manipulate the incidence structure via weights, use multiple incidence matrices to model directed hypergraphs;
Non-backtracking variants, such as density matrix techniques that approximate the path history of a random walk, to reduce the likelihood or prevent revisiting or following previously visited nodes and edges. At each step, density matrices corresponding to the edges or nodes are added to a history accumulator density matrix. The system then assigns a lower probability to transitions to nodes or through edges with CCR density embeddings that are similar to the accumulated history density; and Variants which mix the edge and node distributions by relaxing the bipartite structure (by for example, adding self-loops as diagonal entries in bipartite adjacency matrices).

In some embodiments, the system may include rules to override the ranking schedule and instead keep certain nodes and edges visible at defined levels of zoom. These rules may be user-defined, or they may be based on any number of received factors. If so, then when applying these rules the system will keep the certain nodes and edges visible at the defined levels of zoom, even if the ranking would determine that they should be hidden at those levels of zoom.

As noted above, the node(s) displayed in the user interface will be associated with a time period. However, the distance between pins displayed on each node need not necessarily be consistent with time-scale. The system may compress some time periods, such as those having a lower density of activity, or lower-ranked activity, in favor of allocating screen space to other time periods, such as those having a relatively higher density of activity or relatively higher-ranked activity.

In some embodiments, to determine how much information to display on a screen at any given time, or to determine the size of a time window that should be displayed, the system may consider the "tempo" of information received that corresponds to a displayed node, and present information according to the tempo. The tempo is a rate by which new objects are added to a workstream over time. A time period during which a significant increase in tempo occurs will have more events to display than a relatively lower tempo time period. Thus, the size of the time window that it displayed at a given level of zoom may depend not only on the zoom level but also on the tempo of information that relates to the workstream at a selected location. This is illustrated by way of example in FIG. 7, in which a workstream 750 is associated with various events (each represented by a circle), and the time of the workstream 750 proceeds from the bottom of the illustration to the top. In each of the first three time increments 701-703 the rate of ingestion of new events is zero to two events over the time increment. However, in time increment 704 five events are noted during the time increment, representing more than a 200% increase over the next highest object ingestion rate. By way of example, if the system detects that a workstream has a rate of receipt of new events over a time interval that is more than a threshold level (example: 50%) above the rate of receipt of new events over prior time intervals of similar size, it may analyze those new events to determine whether to assign a new node to any of the events. If the system identifies a new set of common features in some of those events it may assign a new node to those events. Alternatively or in addition, the system may output a prompt to a user to define a new workstream to associate with at least some of the events.

Tempo Estimation

Figure 7:
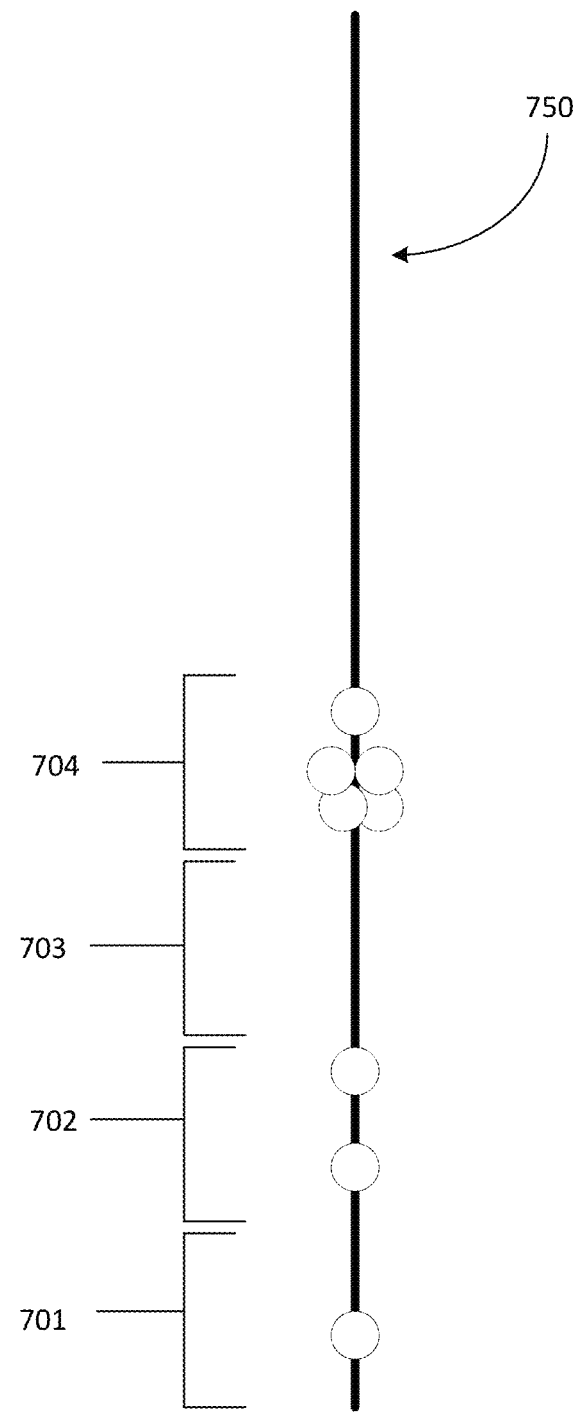
FIG. 7 illustrates how the system may identify changes in tempo of objects associated with a workstream.

An uneven arrival of events such as that shown in FIG. 7 can create challenges for many temporal signal analysis techniques. To address this, rather than simply partitioning time windows into equal sizes, and rather than expanding or contracting each time window equally as a user zooms in or out on a particular view, the system may use several optimization criteria to generate nonlinear partitions of time. This document may refer to such techniques as "tempo estimation". With reference to the two equations presented below, the system may consider $\tau$ to represent an ordered selection of times $t_i$ such that the $i^{th}$ interval extends from $t_i$ to $t_i+1$. The $X_j$ entry corresponds to (in some cases non-aggregated) density matrices for discrete timestamps:

Intra-period quantum state purity maximization:

$$\sum_{i=0}^{m} Tr\left(\left(\sum_{j=t_i}^{t_1+1} X_j\right)^2\right)$$

Inter-period quantum relative entropy minimization:

$$\sum_{i=1}^{m} QRE\left(\sum_{j=t_i}^{t_1+1} X_j, \sum_{j=t_i}^{t_1+2} X_j\right)$$

The system may employ one or more variations of the techniques described above to generate tempo-depending time partitions. For example, the system may generate random partitions and select the best according to the above maximization or minimization criteria. The system may also apply various normalization approaches to aggregated density (such as weighted averaging), and it may apply semi-definite, combinatorial, convex, and non-convex optimization techniques to optimize the temporal partitioning. In addition, the system may consider not just adjacent periods but also relationships between temporally separated periods. Further, the system may consider tempo of weighted subgraphs by incorporating an observable density matrix to filter the overall filter matrix.

Waveform Embedding of Time Distributions

Just as the system incorporates features that solve the graph embedding technical problem as described above, the system may incorporate features that overcome the technical challenge of aggregating or folding representations of time such that they can be unfolded (i.e., separated). The system therefore uses a compressed context representation that allows the system to represent a combination of workstreams and decompose constituent parts. For example, a workstream may represent the combination of an entire team having multiple members, but the system or a user might want to visually breakout temporal detail of a particular team member's contributions, or use that temporal detail to accelerate data retrieval from storage systems. (Example: filtering to "Alice's activity on Tuesday afternoon and Thursday between 3:00 pm and 5:00 pm" instead of a coarse filter such as "Alice's activity in March".)

To do this, then when embedding objects in the compressed context representation the system may use a waveform embedding approach. Some approaches to waveforms that the system may employ include:

Positive one-dimensional (1D) waveform: An array where each entry counts the number of intervals that overlap discrete sequential time spans.

Net 1D waveform: An array where each entry represents counts the net change in number of intervals (number of starting intervals minus number of ending intervals) in discrete sequential spans.

"Double-entry" 1D waveform: A pair of arrays where one array counts the number of interval starts and the other interval terminals in discrete sequential time spans.

Two-dimensional (2D) density waveform: The system may use the same density matrix embedding technique (though in this case taking the self-outer product of a 1D hypernode waveform). This allows the system to encode that, for example, activity at a time $t_1$ is related to activity at a time $t_2$ but not related to activity at time $t_3$ in the same way we distinguish the relations of hyperedges in an aggregate. (Example: aggregate of individual person activity waveforms can indicate that no single person was active during both interval A and B.)

Tempo-based time partitions may result in more representative waveforms with a fewer number of discrete steps.

As the user interface is zoomed in and out, a particular event (edge) may be associated with multiple workflows (nodes). Thus, the same event may appear contemporaneously on multiple nodes. If so, then if the timeline is presented along one axis of the user interface (such as the vertical axis), the event will appear multiple times along a single line of the opposing axis (such as the horizontal axis).

Optionally, for one or more events that are displayed on the timeline, the user interface may provide an interface via which the user may select the event and access the particular data object(s) from which the event is derived. For example, in FIG. 3 pin 342 corresponds to an event that is a legal review meeting. The object for this event may be a calendar application entry that the system received or indexed. If a user selects that event such as by touching or hovering over the pin with a finger (on a touchscreen) or by using a mouse or touchpad to direct a cursor over the pin, the system may trigger the object's application (such as the calendar application) to launch and display the object (such as the calendar entry for the legal review meeting). As another example, pin 347 corresponds to an event that was the sending of a particular email message, and selection of that event via the user interface may trigger the email application to launch and display that message. The system may do this by, for example, using deep linking techniques and application protocols. For example, the system may associate a URL or other address of the object to link the object with the actuator. The link directs the operating system to navigate to the object's application (such as a mail application) and display a specific object (such as a message in the mail application). Optionally, a pin may be displayed in the form of an icon of the application from which the object was generated, such as an envelope icon or the particular logo of an email client or a document icon for an item generated by a word processing application Depending on the level of zoom, a pin may be associated with multiple objects (i.e., multiple edges). If so, then instead of displaying an icon or launching an application that displays a selected object, selection of a pin may cause the system to display a collection of objects associated with the pin (such as in a list format, in which the user may select individual objects in the list to view), so that system's response to a user selection will vary depending on the scale that is being displayed at any given time.

Figure 4:
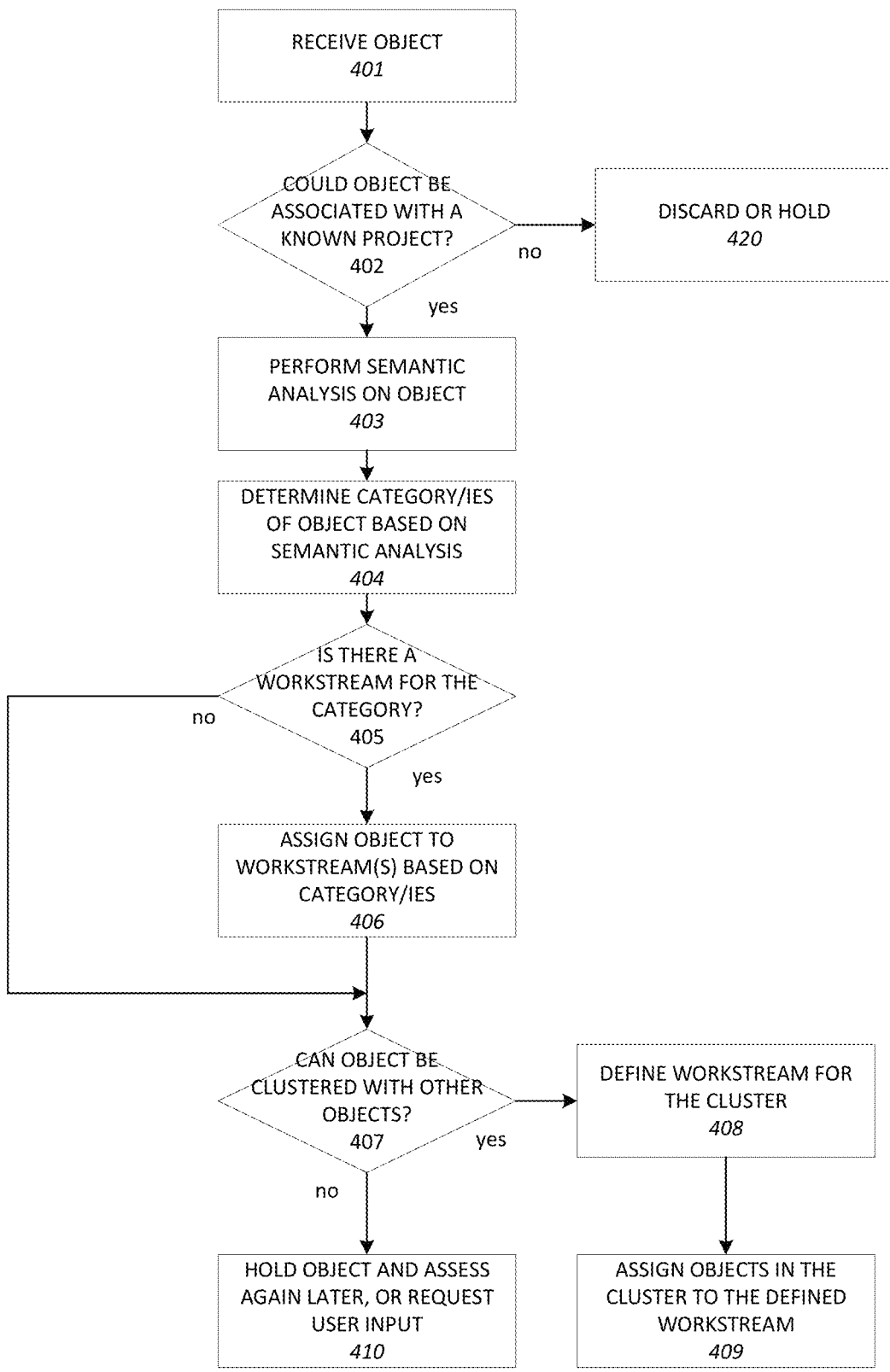
FIG. 4 illustrates a process by which a workflow presentation system may analyze newly ingested objects and assign objects to workstreams.

Before being able to display the workstreams and events of FIGS. 2 and 3, the system must ingest data for various objects and associate each object with one or more workstreams. FIG. 4 describes how the system may do this. The system may receive any number of objects (step 401), which are electronic representations of events that are associated with a workstream, such as: electronic messages managed by an email, chat or other messaging application; documents (or updated versions of documents) managed by a word processing or publisher application; calendar entries from a calendar application; media files; stored data sets; browser history entries; and other objects. The system may receive objects (step 401) from an originating application in any number of ways, such as by using an API of the application from which the object originates, by a process via which the application pushes objects to the system, or by accessing a data store of objects and extracting objects from the data store for analysis. Data may be sent to the system by external sources (i.e., "pushed" to the system), or the system may analyze applications or systems and extract ("pull") data from those applications or systems.

For each object, the system may perform a preliminary analysis to determine whether it could be associated with a known project (step 402) and thus a candidate for inclusion as an event in one or more hypergraphs for that project. The system may do this using any suitable rule set, such as by: (i) analyzing a header, metadata or content of the object to determine whether it was created or modified by a person or group who is part of a known project (or sent to such a person if a message, or that includes such a person if a calendar entry); (ii) performing semantic analysis of object content to determine whether the content includes any material that is semantically related to a known project; (iii) determining whether it is an updated version of a document that is already associated with the project, or by determining whether it is a message that is part of a string that is already associated with the project); and/or (iv) using other criteria. Optionally, the system also may offer a user the ability to associate an object with a project, and if so at step 402 the system will use the user-selected association. If the object is not associated with a known project, then at step 420 the system may ignore or discard the object to save memory and processing time, or the system may archive the object for analysis at a later time.

If at step 402 the system determines that the object is associated with a known project, then the system will assign a label to the object. Labels identify the project, subproject or task that is associated with the object and relevant to the time range displayed.

The system will then perform semantic analysis of the object (step 403) and use the results of the semantic analysis to determine one or more categories of the object (step 404). The semantic analysis (step 403) may yield one or more compressed context representations (which this document also may be refer to as hidden representations or compressed representations), and in step 404 the system may look for other compatible other compressed context representations to find categories of objects with which the analyzed object is compatible. For example, the system may apply one or more NLP algorithms to the object to automatically identify keywords, entities, or topics in the object, each of which may be considered to be a category, or semantically related to a category. Such algorithms may include, for example, open source applications such as the Apache OpenNLP toolkit or the Stanford CoreNLP toolkit. For example, the system may use named-entity recognition to extract person and/or company names from an object. In step 403 the system also may extract metadata from the object in this step. In step 403 the system may then associate the electronic object with one or more categories that are semantically related to a recognized named entity of the object. When doing this the system may also associate metadata with the object in which the metadata includes the category and/or other labels for the object.

Some clustering algorithms may operate on either nodes or edges, while others may operate on both. The system also may perform temporal clustering that arranges items by time, such as by a maximum time from first event to last, or maximum time between events. The system may perform top-level partitioning to determine a number of top-level workstreams that should be discretely considered. The system also may perform cluster post-processing such as removal of outliers (i.e., eliminating items that have weak connections to the cluster) and filtering clusters based on one or more rules. An example filtering rule is: if a group of messages all include the words "thank you", or all include a particular confidentiality boilerplate, then that characteristic of those messages should not be considered in the clustering decision, or at least it should not be the sole reason to cluster those messages.

Once an initial hypergraph data set has been determined, the system will construct one or more workstreams from the data. As the system maps the data for larger hypergraphs to those of smaller hypergraphs at various levels, clustering and folding will yield workstreams made up of edges and nodes that exceed threshold rankings at the relevant levels. The initial onboarding of data will be discussed in more detail in the context of FIG. 8 below. As an initial data set is onboarded, the system will store categories for each workstream, and it will determine whether one or more categories match that of a known workstream (step 405). Once defined, then when ingesting new objects, if the category of the object matches a category of one or more workstreams, the system may add the object metadata to the hypergraph data and assign the object to each such workstream so that the object becomes an event (edge) in the workstream (node) (step 406). If not (or even if so), the system may also determine whether the object is associated (clustered) with other objects due to semantic similarity (step 407). If at least a threshold number or collective rank of objects are clustered without a common workstream for the cluster, the system may define a new workstream (step 408) for the cluster and assign the clustered objects to the new workstream (step 409). When adding an object to a workstream, whether at step 407 or step 409, the system will inspect a timestamp of each object (which may be metadata or part of the object content) to identify the chronological location within the workstream at which the object will be placed.

If, at the end of the process, any object cannot be associated with any known workstream (at step 405) or clustered with other objects (at step 407) to define a new workstream, the system may discard the object or hold it for re-analysis later as workstreams are further defined.

The system will repeat the process of FIG. 4 as the workflow progresses, as new objects are received and added to the workstreams.

Figure 5:
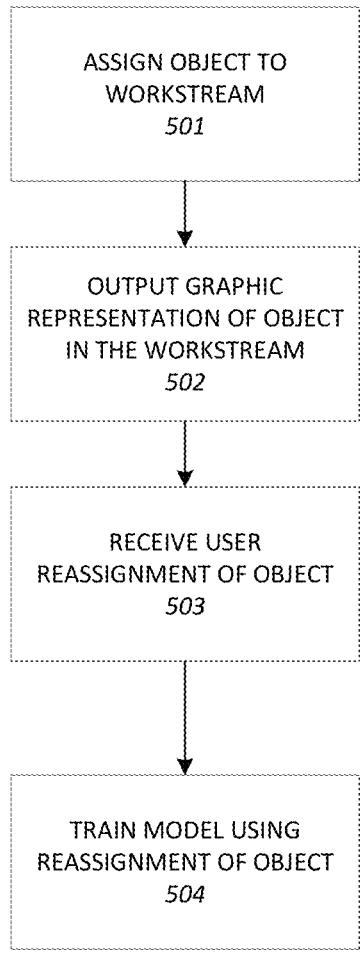
FIG. 5 illustrates a process by which the system may update a model that it uses to assign objects to workstreams.

The process described above is a high-level process, but in practice the system may also use a machine learning model such as a convolutional neural network (CNN) or a recurrent neural network (RNN) to assign objects to workstreams. The modeling may include any suitable graph algorithms (and especially hypergraph extensions of such algorithms) such as graph kernels, graph convolution, graph partitioning, graph clustering, graph attention, graph embeddings, graph neural networks, and/or PageRank. The system may be trained on a limited number of objects, and the model may refine itself as more objects are ingested or analyzed. For example, FIG. 5 illustrates that after the system assigns an object to a workstream (step 501), it will output a graphic representation of the workstream via a display device user interface (step 502). The user interface may permit a user (if authorized) to reassign any object (step 503), either by removing it from a workstream or by moving it to another workstream. If the system receives such a reassignment, it may provide the new object-workstream association to the machine learning model (step 504) so that the model may learn from the correction and use the result of the reassignment to make better workstream assignment decisions on future objects. In addition, the system may use prior information to down-weight the past context, and update the future context. Further, if a user duplicates an object and assigns the object to multiple workstreams, the representation may reflect all contexts in which the item appears.

In addition to reassigning an object, a user interface may enable a user to add objects or annotate existing objects such as by editing labels, assigning a rank or adjusting the assigned rank, supplementing an object with a timestamp or other data, or the like. The system may store this data so that it can display the data when a user selects an actuator to display an object. It also may use this user-supplied data to help train the model.

Figure 8:
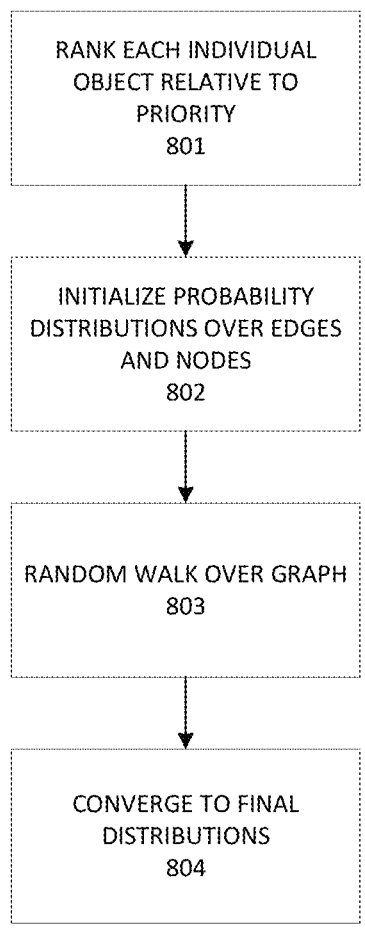
FIG. 8 illustrates various elements of a ranking process.

As noted above, to determine what nodes, edges and pins to display in the hypergraph scale that applies at any given scale of zoom, the system will perform a ranking process to assign ranks to each node, edge and/or pin. FIG. 8 illustrates how the system may accomplish this. At step 801 the system applies heuristics to determine the rank of individual edges and nodes relative to some concept of priority. For example, for a given user-message combination, if the user is a recipient of the message, the rank of that message object may be relatively lower than the rank of message objects for which the user is the sender of message (and the rank may be lower still if the user is copied on the message but not indicated as a directed-to recipient of the message. Factors such as whether the message related to search terms, relative recency of the message to other messages, and other factors may be considered in the rank as well. Additional factors may include whether a user identified the message as important, the level of interaction by other workgroup members with the message, whether the message was human-generated or automatically generated, and other factors may be considered as well. The rank may be a sum or other function of any of these factors, some of which may be weighted more or less than others.

Ranking of events in this manner allows the system to provide each user, or each search, with a unique ranking of events and workstream that are relevant to the user or search. At 802 the system then initializes one or more probability distributions over nodes and edges of a hypergraph reflecting the relationship structure of the objects. (Note: the distributions over nodes and edges may be independent of each other.) At 803 the system then performs a random walk over the hypergraph starting with the heuristic distributions and converging to the final distributions at 804. This process may be compared to that employed by the PageRank algorithm for graphs, but the separate distributions for edges and nodes is a unique adaptation for hypergraphs.

As noted above, when zooming out the system will fold various edges and nodes and therefore adjust the vertical and/or horizontal positions of pins in the displayed graph to move them closer together, to make them overlap, and to hide some pins so that they are no longer seen. Edge folding can take the form of: (i) temporal folding, which folds edges into fixed-time steps; and (ii) thread folding, which combines edges corresponding to a particular object (such as emails in an email thread) into a single edge representing the thread. Node folding can combine nodes, such as by combining nodes for contacts into work-group clusters or by combining entity aliases into a common entity (such as MS, MSFT, Microsoft→Microsoft). The system may use clustering algorithms to direct folds of the hypergraph, and it may aggregate the ranks for folded sections. By way of example, the probabilities associated with a random walk for two nodes (or edges) merged into single node (or edge) may be sum of the two probabilities. As the user zooms in to reveal more detail), the probability threshold for showing a particular node/edge is lowered, when the threshold would reveal a sub-node (or edge) of an aggregate, the aggregate node (or edge) is hidden and the sub-nodes (or sub-edges) are revealed.

When zooming in (i.e., when unfolding), the system may split one or more nodes or edges into multiple nodes or edges and therefore adjust the vertical and/or horizontal positions of pins in the displayed graph to move them further apart, to separate pins that overlapped each other, and to show some pins that were previously hidden from view. This is a nonlinear process, and the determination of which nodes and edges to split will be determined with priority given to those edges and nodes having a relatively higher rank than the others. For example, when zooming in the system may take a single edge that is associated with a multiple-topic email message and split it into multiple edges, each of which is associated with a particular topic in the email message. In this example, the from edge will always be a single edge, while the others could unfold into multiple edges. Unfolding also may take the form of duplicating an edge, such as by creating individual time-specific edges for a document that is relevant at multiple times. Examples of node unfolding include ego splitting (i.e., splitting a workgroup node into nodes for individual workgroup members, or splitting a node for a single person into separate nodes for various roles that the person performs for the organization), as well as stranding (i.e., taking long-lived nodes and breaking them into temporally bonded strands).

At various levels of zoom, the system maintains compressed context representations of various objects that are displayed. A compressed context representation includes one or more vector representations derived from text content of associated objects and graph structure. A compressed context representation may also may include pointers to other compressed context representations, metadata for identification and ownership, metadata about vector embedding space, read/write permissions, cryptographic keys, and/or change history of an object. Some compressed context representations are explicit or external (third party metadata) and others derived via machine learning algorithms. Compressed context representations enable users to attach labels to larger concepts like workstreams instead of individual objects such as emails.

Compressed context representations may support several features of visualization as well as user interactions. For example, compressed context representations may support graph clustering, and/or visual layout. Compressed context representations can vary by position in map or relative to object (e.g. top/bottom of rail) and zoom level. Compressed context representations can also vary by viewer (individual and role within organization) and/or context (just as people tend to care about different aspects of a story, the compressed context representation can emphasize different aspects of a node relevant to a particular viewer at a given time).

The system's use of compressed context representations also can allow for the sharing of certain discrete information about specific objects among multiple users, who may be from different organizations or teams and thus may have differing access rights, while maintaining the security of the overall object and/or the workstream with which an object is associated. For example, an object may be an email message that was sent by a user who is with Company X to other users who are with Companies Y and X. The sender and all recipients may need to track and include that object in workstreams that they each monitor, but Company X's users may be restricted from seeing all workstreams that are available to Company Y's users, even of some of those workstreams include the object. The compressed context representation of an object allows the system to include all object details in the compressed context representation, but limit each user's access to those details that they are permitted to access in their assigned role. CCRs also may be configured for selective access and malleability, so some users may have permission to update or read only some sub-components of a CCR while not receiving access to other sub-components. The compressed context representation may be secured by being encrypted, and it may require a user to present an access token (i.e., a key) that is configured to decrypt the representation. Other security protocols such as access control lists may be used.

Figure 9:
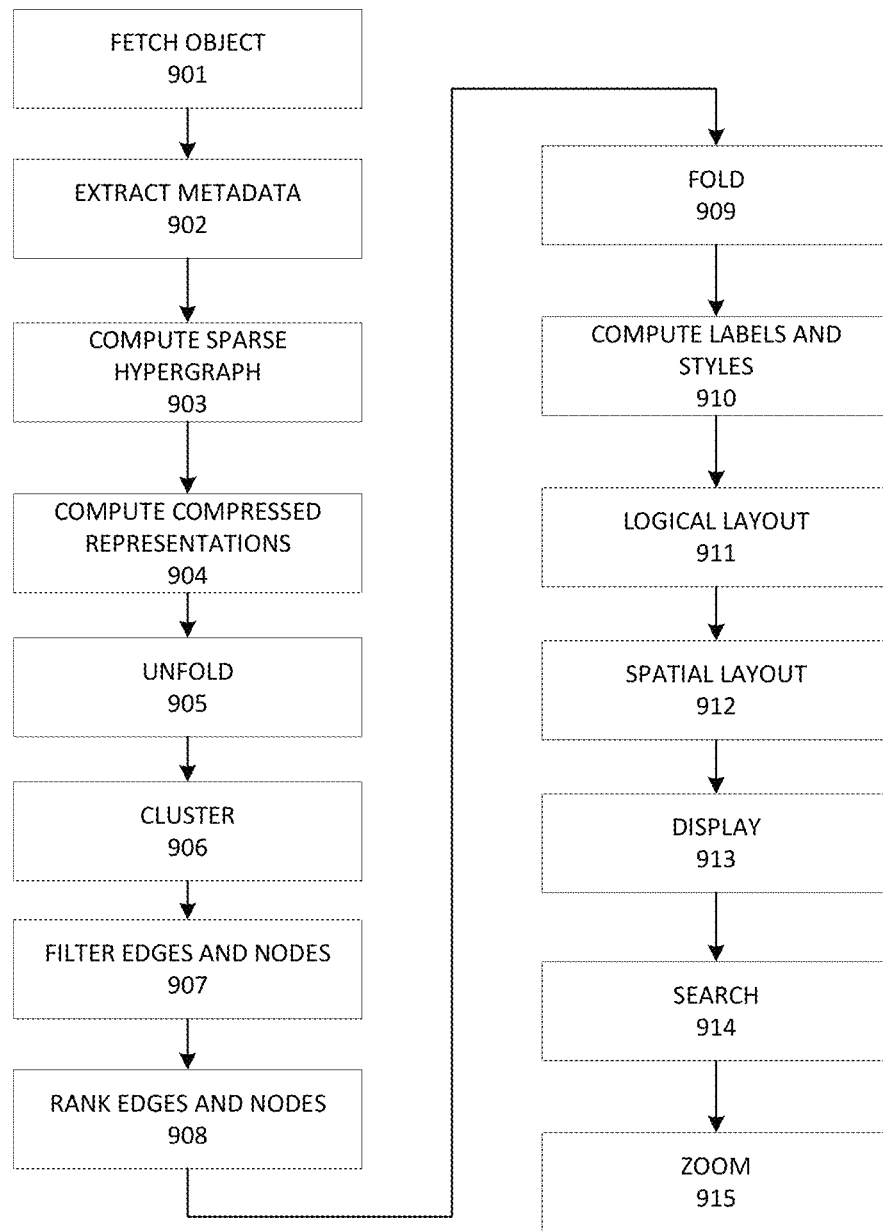
FIG. 9 illustrates additional details of a process of onboarding data into an initial hypergraph representation, along with a process of rendering the data through various graph levels in response to a user request to zoom in or out of the graph representation.

FIG. 9 illustrates an additional process in which the system computes a set of hypergraph data with compressed context representations. The system will fetch objects such as e-mails or other documents (step 901) as it did in step 401 of FIG. 4. The system will extract metadata (step 902) from each object, examples of which include timestamps, contact information, hidden fields such as Lightweight Directory Access Protocol (LDAP) identities, text content, and/or context such as thread history. The may be done using keyword extraction, per-document ranking signals (such as urgency or risk). Other methods may be used in this step. The system will then use this metadata to compute a sparse hypergraph (step 903) using procedures such as that which will be described below in the context of FIG. 12.

At step 904 the system will compute initial compressed context representations for each object using dimensionality reduction techniques such as topic modeling and contact embedding to map the large sparse hypergraphs (examples of which are discussed in the context of FIG. 12 below) into smaller vectors, while preserving all of the data. Topic model vectors and contact embedding vectors are examples. The system may, in some embodiments, also use word vectors and structural vector embeddings for documents and subgraphs. The system may combine outputs of multiple embedding algorithms using sums of density matrices (in some cases equivalent to covariance, Laplacian matrices) based on various subgraph slicings, and/or embeddings based on differences (e.g., before/after subgraphs) around a particular node/pin/edge. Compressed context representations can be computed or updated from navigation transitions (i.e., moving up or down one or more levels of zoom and/or interaction with a pin) within the application, and navigation with other applications (e.g., navigation between web pages in a web browser). Multiple-step navigation paths may be represented by temporally weighted aggregates of multiple transitions. The system may compute new hidden representations (such as for navigation transitions) using any of the following steps, including unfolding, folding, clustering, filtering and/or ranking, as well as the process discussed below in FIG. 11. Thus, the system may encode navigation actions as compressed context representations.

The system may unfold the hypergraph at 905 by performing non-linear splitting of various nodes and edges, and at step 906 it may cluster multiple objects in the unfolded graph using methods such as hierarchical agglomerative clustering, spectral biclustering and/or coclustering to yield a set of workstreams, as mentioned in FIG. 4 above. Additional steps that may be performed here include, for example: (a) cluster filtering (eliminating low-quality clusters) based on heuristics and cluster quality metrics such as Davies-Bouldin index, Dunn index, and/or the Silhouette coefficient; (b) cluster outlier detection; (c) overlapping cluster expansion (i.e., relaxing a single-assignment clustering algorithm into a multi-assignment clustering algorithm).

Up to this point, steps 901-906 may be performed on a corpus of objects, with the results stored in a backend server. The system may re-perform steps 903-906 on any object as it learns new information that is relevant to the object. For example, as the system adds a new contacts cluster or topic to a user's workstream, the system may perform steps 903-906 on already-ingested objects that could be relevant to the workstream to determine whether to actually associate any known object with one or more edges or nodes to the new cluster or topic.

When the user first activates the user interface, the system will render the hypergraph at a default level of zoom, which may be a highest possible level, or which may be the level at which the user viewed the hypergraph during the user's most recent session. When the user then works within the system, steps 907-913 illustrate a rendering process by which the system may update the display to render different levels of the hypergraph data. The system may perform these steps dynamically in response to a user request or in response to user actions such as search, zoom, pan or scroll. When the system receives such a request, at step 907 the system may select edges and nodes to fold or unfold based on factors such as search terms, time range, and/or metadata filters. After filtering out edges and nodes that are not responsive to the request, at step 908 the system will rank the remaining edges and nodes to determine which ones to display in response to the user's request. The ranking process may follow algorithms such as that known as PageRank when the request includes, at least in part, a search query. At 909 the system will then fold (or unfold) the nodes to yield the most highly ranked nodes that fit within the time frame and display size. Node folding will combine nodes in a cluster until the aggregate rank of a clustered group of nodes exceeds a ranking threshold that merits display in response to the request. Unfolding does the opposite (for example by splitting a topic that relevant to multiple clusters of interested people). Edge folding will operate in a similar manner as node folding, but will also consider temporal restraints (such as that edges must be within the same zoom-depending time window to fold into each other).

During the process of steps 905-909, the system may update the hidden representations of objects that are presented (or clustered for presentation) at the applicable level of zoom.

At 910 the system will determine labels (text and/or images) and styles (color, thickness, opacity, etc.) for the clustered/aggregated edges and nodes that equal or exceed the threshold ranks to merit display. The system may thus modulate styles of visual presentation to reveal metrics about a user or team's activity. The system also may change the appearance of a rail to signal certain details that correspond to a label. For example width may reflect team efforts (more contributions=wider rail), while rail opacity or brightness may vary to reflect the viewing user's personal contribution. As another example, relative rail opacity may be used, with relatively opaque sections reflecting periods in which the amount, frequency, and/or type of contributions from the user to that workstream are higher than that of other times (or other team members/stakeholders) shown on the rail. Visual properties may be tied to different underlying metrics, which optionally may be defined by users.

At 911 the system will determine a logical layout for the clustered/aggregated edges and nodes by horizontally ordering the nodes and vertically ordering the edges (if layout is vertical—this will be reversed with horizontally-ordered edges and vertically-ordered nodes in a horizontal layout). The system also will determine a spatial layout 912 by assigning x, y coordinates to pins to reduce unused space and help increase proximity of related rails, subject to any required constraints for readability. Finally, at 913 the system will display the modified graph by outputting a virtual representation of the objects on a display device.

Once a graph is displayed, at 914 the system may offer a search field within the user interface, via which a user may enter and the system may receive (as text or audio input) one or more search terms. The system may then search the data set of available objects, workstreams to return a list or other structured set of candidate objects or workstream having labels that semantically relate to the search terms. The system may use any now or hereafter known natural language processing and ranking algorithms to do this, such as syntactic matching and/or semantic matching with dynamic clustering. The matching may consider an object's metadata or content; the application from which an object originated; the identity of a user who created, received, or otherwise is named in the object; a date associated with the object; or other parameters. The system may return the object itself or a URL, hyperlink, or other pointer to the object. When returning an object (or a reference to an object), the system may return not only the object or its reference, but also information from a compressed context representation with which the object is associated. Then when the user examines the object or its associated information, the system may save a record of the user activity (such as access time, user identifier, and information reviewed) to the object's compressed context representation.

In addition, the system may offer users the ability to subscribe to a search by entering search parameters and receiving automatic notifications that the system will generate when new objects that match the search parameters are added to a workstream with which the user participates. In particular, after the system receives a set of search parameters from a user along with a subscription request, the system will periodically examine the hypergraph data as new objects are received to determine when the hypergraph data includes a new electronic object that corresponds to the search parameters. Upon determining that the hypergraph data includes a new electronic object that corresponds to the search parameters, the system will notify the user that a subscription update is available.

In addition, once a graph is displayed, at 915 the system may present the user with an actuatable user interface element via which the user may cause the system to zoom in or out of a current level of display. The element may be, for example, a slider, an up arrow/down arrow, or an audio prompt that may be entered into a microphone.

In some embodiments the system may use visual identifiers on any given rail, or rail segment, to signify the relative importance of that portion of a rail. For example, relative rail width may be used, with relatively wider sections reflecting periods in which the amount, frequency, and/or type of contributions from other team members/stakeholders to that workstream are higher than that of other times shown on the rail. This is shown by way of example in FIG. 3, in which the middle (primary) rail becomes wider as time progresses from top to bottom, reflecting more team member activity for that workstream in recent times than in earlier times in that workstream.

Figure 10:
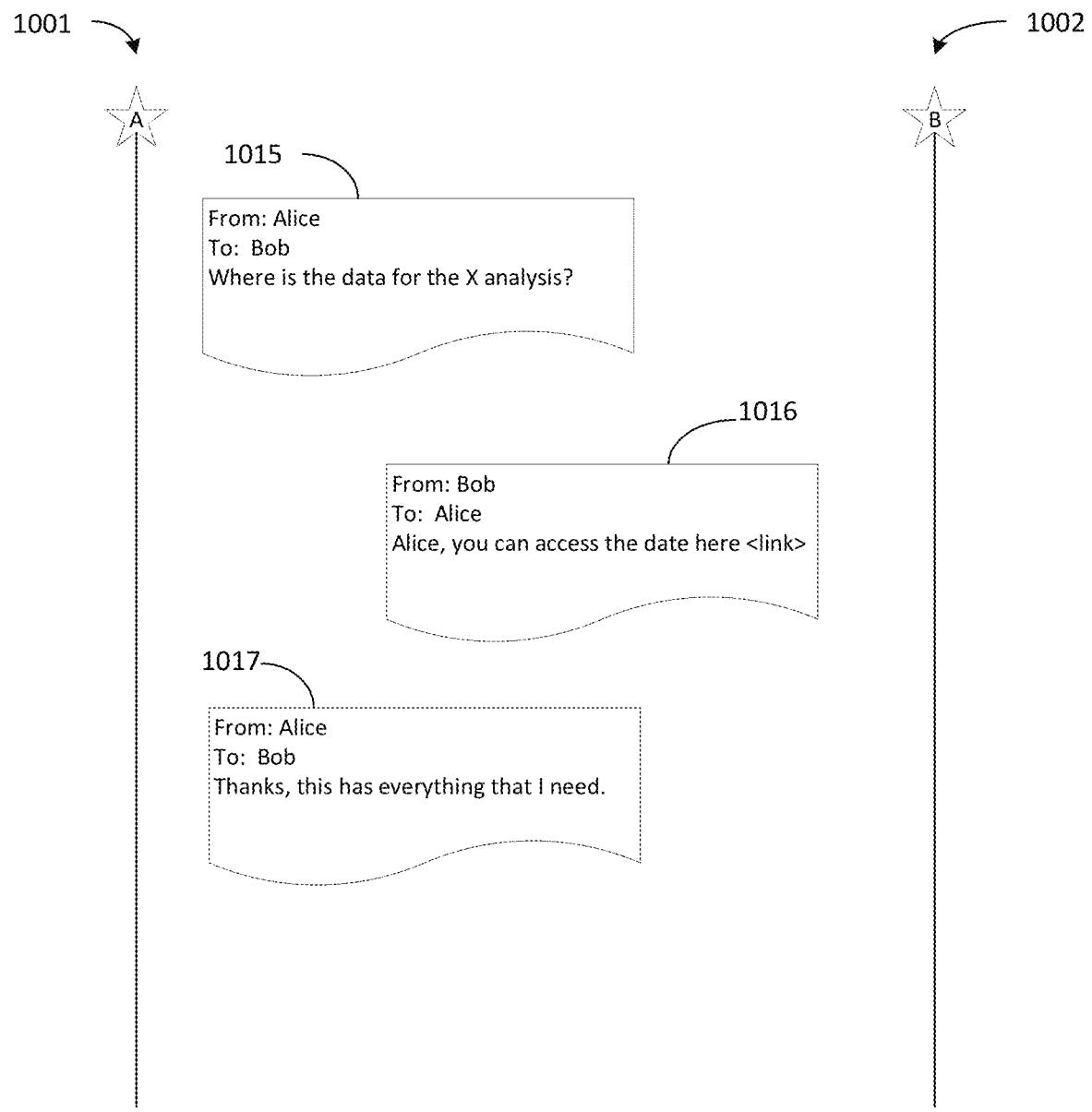
FIG. 10 illustrates how objects that are included in a graph representation may be associated with user-specific compressed context representations.

FIG. 10 illustrates an example of how a group of objects (in this case example a string of email messages) may be associated with two user-specific compressed representations, specifically compressed representation 1001 for user Alice and compressed representation 1002 for user Bob. The first object is a message 1015 in which Alice asks Bob for the status of a task. When Alice sends message object 1015 it will be added to Alice's compressed representation 1001. When Bob reads message object 1015 it will be added to Bob's compressed representation 1002. Bob may then search his stored content (such as documents) for an object that responds to Alice's message, and he may generate a reply message object 1016 that includes a hyperlink to that content. The reply message object 1016 is added to Bob's compressed representation 1002 when Bob sends it, and to Alice's compressed representation 1001 when Alice reads it. When Alice clicks the hyperlink to access the Bob's linked object, Bob's linked object may be added to Alice's compressed representation 1001 but Alice's compressed representation 1001 will not include aspects of the object to which she does not have access rights, such as Bob's notes or metadata indicating non-public workstreams with which Bob has associated the linked object. Alice may then send a reply message 1017, which will be added to Alice's compressed representation 1001 when she sends it and to Bob's compressed representation 1002 when he reads it.

The examples shown in FIG. 10 are just that. The system may maintain dynamic compressed representations not only for users but also for items, collections of items, and item relationships. Examples include people, teams, documents, document sets or folders, messages, sentences, phrases, times, locations, devices, URLs, domains, email addresses, channels, tags, navigation actions as a relationship hidden representation between a start and terminal state.

As new information arrives, the system may identify new connections and propagate information. Example: the system might associate task X (which the name of the task in Alice's message 1015) with the alternative task Y, as context-specific aliases relevant to the same workstream, and therefore the system associate the link that Bob sent in his reply message 1016 as information related to task Y. The final "thanks" message 1017 and direct name references may be used to reinforce the early inferred connections as higher confidence.

In some embodiments, the system may offer shared and collaborative map views with multiple layers of compressed representations. While users A and B may see same visual representation of an object, the compressed representation may reflect the originating context (example: user A shares object originally, and the hidden representation reflects origin context). The viewing context may then appear as part of a sub-workstream for user B. Manipulating the visual representation of the object (moving to a new workstream) may affect multiple hidden representations depending on the permissions granted to the users. (Example: User C may be presented only a read-only copy in which she can manipulate her visual representation but will not alter the compressed representation for other users.)

The system described in this document enables multi-user interactions, as multiple users may access the system (as shown in FIG. 1) and each user can monitor the progress of a workstream at the same time as each user takes action that updates the workstream.

Figure 11:
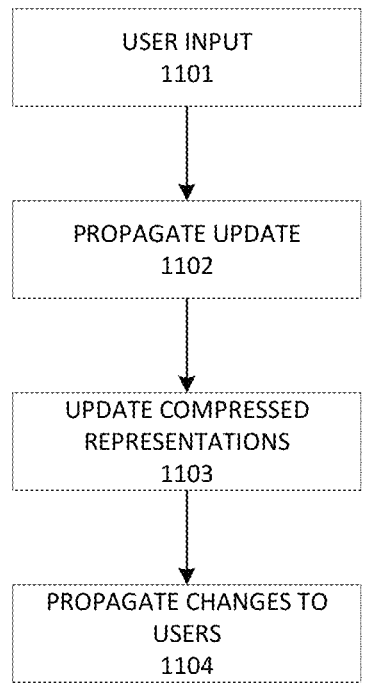
FIG. 11 illustrates how users may modify a graph, and how modifications are propagated through various levels of the graph.

FIG. 11 illustrates how the system may update a hypergraph based on user input. For example, at 1101 a user may input a command to combine two or more nodes (i.e., combine workstreams); split a node (workstream) into two or more nodes (workstreams); combine two or more edges; add/remove a pin from an edge/node intersection; add an annotation, icon or label to a node, edge, or pin; edit a pin, edge, or node label; provide positive or negative ranking feedback, etc. The user input need not necessarily be a command to update the hypergraph, but instead could be simply the input of a new event into one of the applications that the system monitors, such as a new electronic message into messaging application or a new meeting entry into a calendar application. Upon receipt of an update, the system will modify the compressed context representation(s) of all objects that the user edited to reflect the changes. The system also may re-calculate any system output that rely on the edited compressed context representation(s).

At 1102 the system may propagate the update by transmitting a description of the update and the compressed context representation for modified object(s) on the display device to the backend server. The server may propagate the update for one or more related objects such as aggregates containing an object, constituents of a folded aggregate, and/or per-user objects (example: an object corresponding to another user's copy of an email). An indirect effect of this may include an update to common models for ranking, labeling, and/or status prediction. Optionally, before propagating an update, the system may apply one or more temporal or semantic constraints to determine whether to propagate the update, and if so to which workstreams' edge or edges.

At 1103 the system may update any compressed representations that should be updated in response to the user input. The update will vary on a case-by case basis may involve steps such as: computing new vector embeddings; adding or subtracting vectors representing the change of an embedding; and/or re-computing rankings, clustering, fold and unfold operations. An indirect effect of this may also be to update common models for ranking, labeling, and status prediction. For example, if a user adds an annotation indicating that a pin on a workstream is "complete", the system may add the instance and a contextually relevant hidden representation of the subgraph as a training instance for a completion status predictor. The system also may, for example, consider sentence-level embeddings of closely-related (by proximity of clustering or hidden representation) emails temporally preceding and following the annotated pin. These training instances may be combined into global, customer/company wide, team-based, role-specific, industry-specific, or other modeling aggregates to improve general ability of the application to predict the label or annotation from NLP and graph structure signals. In the process above, the system may use search terms or information gathered about what a user typically interacts with or is currently doing (including browser pages, open documents, physical location) to rank and filter edges and nodes of the hypergraph to what is likely contextually relevant.

Finally, at 1104, the changes are propagated to users, and viewers that are viewing objects that are affected by the changes will see modifications to their graphs as they receive the changes. The users may be, for example, those who subscribe to changes to the node, to a project, or to another grouping of the hypergraph data.

Wave Function Collapse

Wave Function Collapse (WFC) is an algorithm that the system may employ to solve a variety of constraint-problems that may involve backtracking and non-convex optimization. Despite its name, the algorithm is not a physically realistic interpretation of the same term in quantum mechanics, but it does involve similar mathematical considerations particularly when combined with the density-based representations. WFC enables the system to make coherent inferences in situations where many discrete inference tasks depend on each other.

A basic Wave Function Collapse algorithm is described in pseudocode form below:

(iii) A Partial collapse in which the system may consider "collapse" to always be in progress so collapse and preserve some uncertainty to facilitate future updates and corrections.
(iv) a Dynamic belief/state space, in which a hypothesis may involve adding or removing discrete beliefs.

```
Inputs:
    E = tensor of Evidence
    CE = vector of evidence weight ("evidence credibility")
    B = tensor of Beliefs
    CB = vector of belief weight ("belief confidence")
    HypGen = hypothesis generator function
    Likelihood = likelihood function
    Update = update function
    Propagate = propagation function
    Stop = termination function
    CollapseThreshold = Scalar probability collapse threshold
    EvidenceDecay = Scalar discounting of evidence to ensure convergence
Outputs:
    Updated versions of B, CB, E, CE
    List of accepted/rejected hypotheses
let Accepted = [ ]
let Rejected = [ ]
while not Stop(E, CE, B, CB):
    let H = HypGen(E, CE, B, CB, Accepted, Rejected)
    if Likelihood(H, B, CB, E, CE) > CollapseThreshold:
        Accepted = Accepted + [H]
        B', CB' = Update(H, B, CB)
        E', CE' = Propagate(H, B', CB', B, CB)
        B, CB, E, CE = B', CB', E', CE'
    else:
        Rejected = Rejected + [H]
        CE = CE * EvidenceDecay
        return B, CB, E, CE, Accepted, Rejected
```

This higher-order function may take one or more other functions as inputs. Examples include:
(1) A hypothesis generator function that considers weighted evidence and weighted beliefs, and generates a (possibly randomized) hypothesis. In some manifestations, a hypothesis generator involves generating or sampling random hyperedges or hypernodes.
(2) A likelihood function that considers the degree to which the hypothesis fits with weighted evidence and beliefs.
(3) An update function that updates beliefs and weights in accordance with one or more hypotheses.
(4) A propagate function that generates new information (indirect evidence) based on the changes in beliefs.
(5) A stop function that prevents the algorithm from running indefinitely.

In alternative descriptions of WFC, the 'beliefs' above are known as states, and the evidence may be called 'observations' or "data". Variations include:
(i) A "wave Functor Collapse" variant in which the beliefs or states either have multiple linked representations (e.g., [semantic] space-time domain and [tempo] frequency-phase domain), or when one or more beliefs represents a map between representations to be refined by the wave function collapse process. The functor corresponds to the category theory notion of a structure-preserving map. In the first case, the propagation function ensures updates to one representation are applied to the other representation (e.g., applying Fourier transform and Inverse Fourier transform to propagate updates made in the space-time domain to the frequency-phase domain and vice versa).
(ii) Online updates, in which the system may perform WFC interactively, incorporating new information from users or newly arrived information to update the output.

Applications of WFC to the systems and methods described in this patent document include:
The system may use WFC to resolve a cold start problem for bootstrapping the relevant context for individual items. For instance, the system may generate a hypothesis interpreted as "there is a workstream around X in time range R," where X may be a topic, person, document, or other structure. The system may then propagate some contextual information to the various other items that have some connection to the hypothesized workstream.
The system may use WFC to solve its primary visual layout problem on the isometric fractal grid, including using it to select summary details such as key phrases, people, and documents.
The system may apply WFC to the tempo time-partition problem described above.
The system may use WFC to generate other forms of complex output including generating text, audio, video, and other data output formats. This may be useful for complex training simulations.

Figure 12:
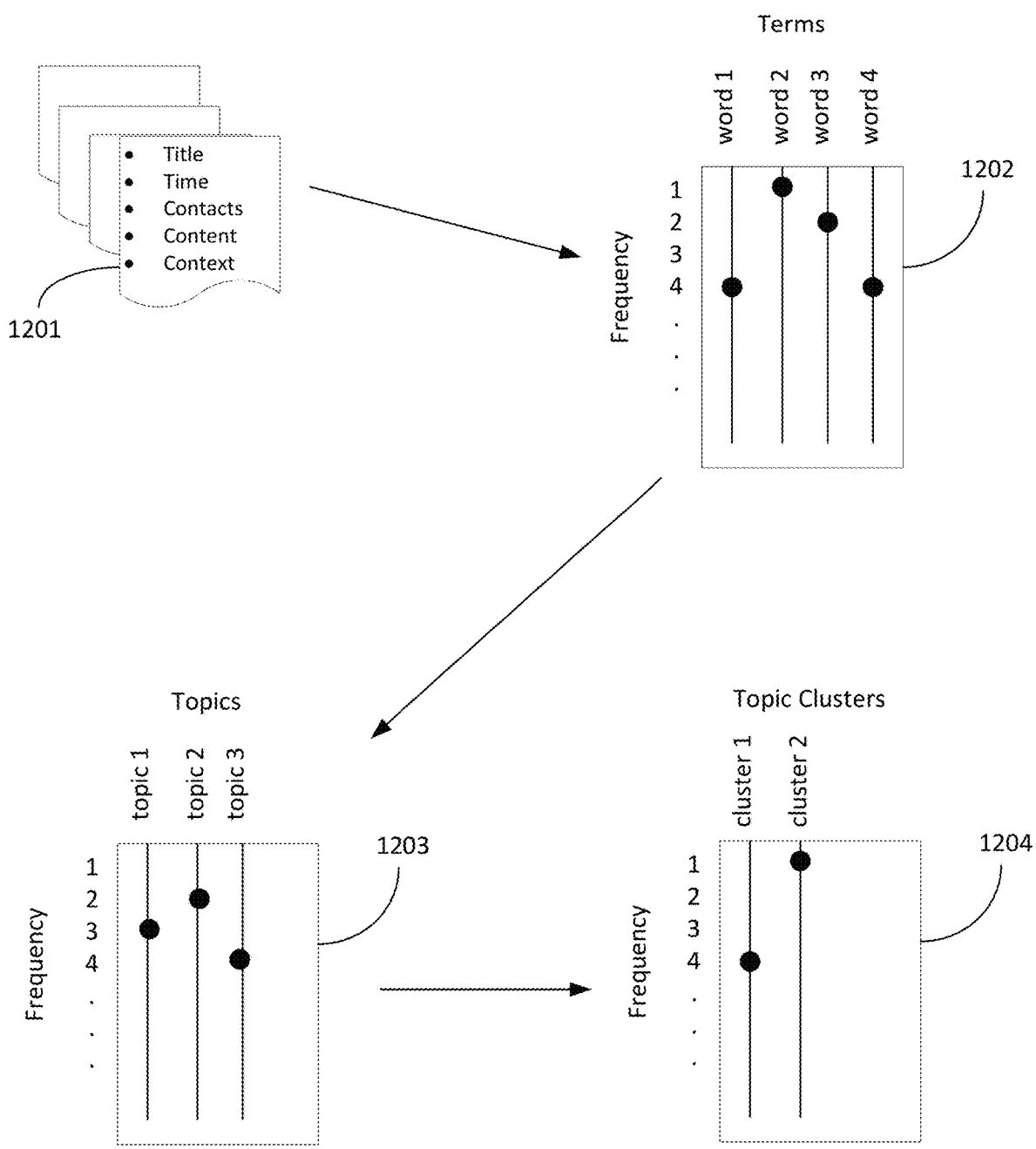
FIG. 12 illustrates an example process of generating a hypergraph from a set of object-related metadata.

FIG. 12 illustrates an example process of generating a sparse hypergraph and/or updating a hypergraph data set to include data for a new object. When the system receives an object 1201 from a communication stream (as shown) or a corpus of objects, it may take content and/or metadata from the object and decompose it into a numeric representation such as a "term-frequency" vector 1202 in which the number of times that a particular term appears is represented. A term may be a word, a phrase, a group of semantically related words such as {run, running, runs} or {John, Johnathan, Jon, Johnny}, a particular contact (for example, based on email address in a to/from/cc/bcc field), a sender's and/or recipient's or author's domain, a date or time, an LDAP identity, and/or other vectors. The initial sparse hypergraph will be derived by stacking the term-frequency vectors from multiple documents to form a sparse numeric matrix in which each column (or row, if the x-y orientation is reversed) corresponds to one term. The system may then group the terms of the various matrices into topics 1203 using semantic analysis methods such as those above, and the system may also cluster related topics into clusters 1204 using similar methods.

Figure 13:
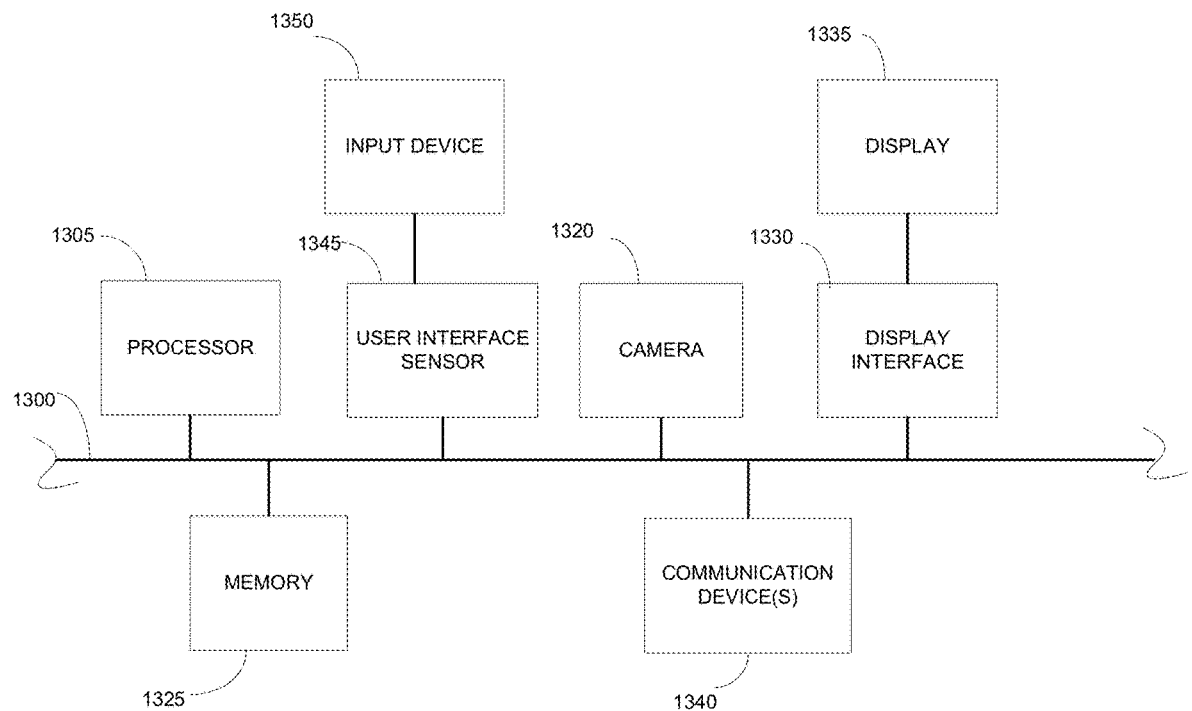
FIG. 13 illustrates example hardware elements that various elements of the system may use.

FIG. 13 depicts an example of internal hardware that may be included in any of the electronic components of the system, such as any of the computing devices described in FIG. 1. An electrical bus 1300 serves as an information highway interconnecting the other illustrated components of the hardware. Processor 1305 is a processing device that is configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1325. A memory device may include a single device or a collection of devices across which data and/or instructions are stored.

A display interface 1330 may permit information from the bus 1300 to be displayed on a display device 1335 in visual, graphic or alphanumeric format. An audio interface and audio output (such as a speaker) also may be provided. Communication with external devices may occur using various communication devices 1340 such as a wireless antenna, an RFID tag and/or short-range or near-field communication transceiver, each of which may optionally communicatively connect with other components of the device via one or more communication system. The communication device 1340 may be configured to be communicatively connected to a communications network, such as the Internet, a local area network or a cellular telephone data network.

The hardware may also include a user interface sensor 1345 that allows for receipt of data from input devices 1350 such as a keyboard, a mouse, a joystick, a touchscreen, a touch pad, a remote control, a pointing device and/or microphone. Digital image frames also may be received from a camera 1320 that can capture video and/or still images.

Terminology that is relevant to this disclosure includes:

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," "upper" and "lower", "vertical" and "horizontal", "row" and "column", or "front" and "rear," are not intended to have absolute orientations but are instead intended to describe relative positions of various components with respect to each other. For example, a first component may be a "horizontal" component and a second component may be a "vertical" component when a device of which the components are a part is oriented in a first direction. A sequence of values in a matrix may be a "row" when the matrix is oriented one way and a "column" if the matrix is rotated by 90 degrees. The relative orientations of the components may be reversed, or the components may be on the same plane, if the orientation of the structure that contains the components is changed. The claims are intended to include all orientations of a device containing such components.

In this document, the term "node" is associated with columns and vertical lines of matrix data (and "edge" is associated with rows and horizontal lines of matrix data) but other conventions are equivalent, for example vertically displayed edges represented as rows of incidence matrices. The terms node, edge, and graph may or may not be extended with the prefix hyper if clear in context. In descriptions of graphs and hypergraphs outside of this document, the term vertex or hypervertex is sometimes used instead of node and hypernode. In a hypergraph, "hypernodes" and "hyperedges" may be interchangeable.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 11.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

When the prefix "sub-" is used in a term such as "subset," "subgroup," "subcategory" or "subgraph," then unless described as a less than full set it is intended to include both full sets and less than full sets. For example, a subset may include the entire set or less than the entire set.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of rendering a user interface for the presentation of objects, the method comprising:
by a workflow management system:
analyzing a plurality of electronic objects that are managed by a plurality of external applications during a time period,
computing hypergraph data from the electronic objects, in which:
the hypergraph data comprises a plurality of edges and a plurality of nodes that are associated with one or more of the edges;
each edge corresponds to one or more of the electronic objects; and
each node corresponds to an item that is associated with multiple objects of one or more of the external applications over a time period,
saving the hypergraph data to a memory,
determining whether a category of a new electronic object corresponds to one or more nodes of the hypergraph, and
when the category corresponds to a node, updating the hypergraph data by associating the new electronic object to an edge of the corresponding node; and
by a workflow presentation system, causing a display device to output a graphical user interface that outputs a visual representation of the hypergraph data by:
identifying a level of zoom to be displayed and a time frame,
identifying a set of one or more nodes that are to be displayed at the level of zoom for the time frame,
for each identified node, determining which edges are to be displayed at the level of zoom, and
causing the display device to display, in a hypergraph, any edges or nodes that are to be displayed at the level of zoom.

2. The method of claim 1, further comprising:
when causing the display device to display any edges or nodes that are to be displayed at the level of zoom, associating one or more pins with each of the edges that are to be displayed; and
outputting each of the pins with an actuator that, when selected, will cause an electronic device of which the user interface is a component to display the electronic object that corresponds to the edge that is associated with the pin.

3. The method of claim 2, wherein the actuator comprises a hyperlink that contains an address of the electronic object that corresponds to the edge that is associated with the pin.

4. The method of claim 1, wherein:
the method further comprises, by the workflow management system for each electronic object that is associated with an edge, determining a rank for the edge; and
for each identified node, the step of determining which edges are to be displayed at the level of zoom comprises using the ranks to determine which edges are to be displayed at the level of zoom.

5. The method of claim 1 further comprising, by the workflow presentation system, updating the hypergraph in response to user input.

6. The method of claim 1 further comprising, by the workflow management system, generating a compressed context representation and assigning a plurality of the electronic objects to the compressed context representation.

7. The method of claim 6 further comprising, by the workflow management system, computing one or more new compressed context representations from navigations within an application, across multiple applications, or both.

8. The method of claim 1 further comprising, by the workflow management system: computing a compressed context representation with one or more associated electronic objects; and
extracting one or more associated electronic objects from the compressed context representation.

9. The method of claim 6 further comprising, by the workflow management system, computing one or more new compressed context representations in response to user input.

10. The method of claim 6 further comprising, by the workflow management system, computing a new compressed context representation from one or more compressed context representations.

11. The method of claim 1 further comprising, by the workflow management system:
analyzing a plurality of new electronic objects that are managed by the plurality of external applications over a new time period;
determining that a rate of receipt of the new electronic objects over the new time period exceeds a rate of receipt of electronic objects over prior time periods by at least a threshold amount and, in response, adjusting a scale of the new time period for display as compared to the prior time periods.

12. The method of claim 1 further comprising, by the workflow management system:
analyzing a plurality of new electronic objects that are managed by the plurality of external applications over a new time period;
determining that a rate of receipt of the new electronic objects over the new time period exceeds a rate of receipt of electronic objects over prior time periods by at least a threshold amount and, in response:
determining that a new node should be created for at least some of the new electronic objects, and
updating the hypergraph data to include the new node.

13. The method of claim 6 where the compressed context representation is associated with a code that is shared via an electronic message, metadata, or physical object to enable retrieval of contextual updates relevant to each electronic object that is associated with the compressed context representation.

14. The method of claim 1 wherein at least some of the electronic objects are messages transferred via a messaging application, audio files or video files.

15. The method of claim 1 further comprising, by the workflow management system:
associating a compressed context representation with one or more of the electronic objects; and
enabling a user to share a subgraph of the hypergraph with another user by sharing a reference to the compressed context representation of an electronic object that is represented in the hypergraph.

16. The method of claim 15 wherein, when the other user accesses the subgraph of the hypergraph, the system determines a display layout to present details from the subgraph of the hypergraph that are relevant to the other user's context and access permissions.

17. The method of claim 1 further comprising, by the workflow management system:
receiving a set of search parameters from a user, along with a subscription request;
periodically examining hypergraph data of the hypergraph as new objects are received to determine when the hypergraph data includes a new electronic object that corresponds to the search parameters, and
upon determining that the hypergraph data includes a new electronic object that corresponds to the search parameters, notifying the user that a subscription update is available.

18. The method of claim 1 wherein:
the workflow presentation system causes the display device to output a subgraph in a waveform based on included event times, and
the workflow management system:
embeds of a plurality of waveforms in compressed context representations, and
uses the embedded waveforms to rank and filter subgraphs according to temporal constraints.

19. The method of claim 1, wherein at least some of the nodes correspond to a timeline for one or more workstreams that are managed by the plurality of external applications.

20. The method of claim 6 further comprising, by the workflow management system:
either:
receiving a user input identifying a workstream of one or more of the external applications that can be a template for a target workstream, or
comparing candidate compressed context representations to automatically detect workstreams of one or more of the external applications having similar density embeddings and using one or more of the detected workstreams as a template for the target workstream; and
generating a compressed context representation for the target workstream and, when doing so, adding a compressed context representation for the identified or detected workstream as a field within the compressed context representation of the target workstream.

21. The method of claim 15 further comprising, before sharing the subgraph of the hypergraph with the other user, including an abstract polynomial lattice encoding with the compressed context representation, wherein the abstract polynomial lattice encoding indicates subpartitions of the hypergraph to share or exclude from sharing.

22. A system for presentation of objects on a display, the method comprising:
a processor; and
one or more memory devices containing programming instructions that are configured to cause the processor to perform functions of a workflow management system and a workflow presentation system;
wherein the instructions to perform functions of the workflow management system comprise instructions to:
analyze a plurality of electronic objects that are managed by a plurality of external applications during a time period,
compute hypergraph data from the metadata of the electronic objects, in which:
the hypergraph data comprises a plurality of edges and a plurality of nodes that are associated with one or more of the edges;
each edge corresponds to one or more of the electronic objects; and
each node corresponds to an item that is associated with multiple objects of one or more of the external applications over a time period,
save the hypergraph data to a memory,
determine whether a category of a new electronic object corresponds one or more nodes of the hypergraph, and
when the category corresponds to a node, update the hypergraph data by associating the new electronic object to an edge of the corresponding node;
wherein the instructions to perform functions of the workflow presentation system comprise instructions to cause a display device to output a graphical user interface that outputs a visual representation of the hypergraph data by:
identifying a level of zoom to be displayed and a time frame,
identifying a set of one or more nodes that are to be displayed at the level of zoom for the time frame,
for each identified node, determining which edges are to be displayed at the level of zoom, and
causing the display device to display, in the hypergraph, any edges or nodes that are to be displayed at the level of zoom.

* * * * *